United States Patent [19]

Miyamoto

[11] Patent Number: 4,958,544
[45] Date of Patent: Sep. 25, 1990

[54] RADIAL ARM SAW

[75] Inventor: Kouichi Miyamoto, Hiroshima, Japan

[73] Assignee: Ryobi Ltd., Hiroshima, Japan

[21] Appl. No.: 38,265

[22] Filed: Apr. 14, 1987

[30] Foreign Application Priority Data

| Apr. 14, 1986 | [JP] | Japan | 61-56601[U] |
| Apr. 14, 1986 | [JP] | Japan | 61-56602[U] |
| Apr. 14, 1986 | [JP] | Japan | 61-56603[U] |
| Apr. 16, 1986 | [JP] | Japan | 61-57988[U] |
| Apr. 21, 1986 | [JP] | Japan | 61-60843[U] |
| Apr. 21, 1986 | [JP] | Japan | 61-60844[U] |
| Apr. 25, 1986 | [JP] | Japan | 61-63590[U] |
| Apr. 30, 1986 | [JP] | Japan | 61-66513[U] |
| Apr. 30, 1986 | [JP] | Japan | 61-66514[U] |
| Apr. 30, 1986 | [JP] | Japan | 61-66515[U] |

[51] Int. Cl.⁵ .................... B27B 5/20; B23D 45/02
[52] U.S. Cl. .................. 83/471.3; 83/477.1; 83/478; 83/486.1; 83/489; 83/701
[58] Field of Search .............. 200/43.17, 43.19, 325, 200/328; 83/471.2, 471.3, 477, 477.1, 478, 483, 486.1, 489, 701

[56] References Cited

U.S. PATENT DOCUMENTS

| 2,312,356 | 3/1943 | Ocenasek | 83/486.1 |
| 2,329,357 | 9/1943 | Mowery, Jr. et al. | 83/489 |
| 2,564,350 | 8/1951 | Wilson | 384/58 |
| 2,835,285 | 5/1958 | Gardner | 83/486.1 |
| 2,926,709 | 3/1960 | Kaley | 83/478 |
| 2,942,632 | 6/1960 | Cassey | 83/486.1 X |
| 3,023,792 | 3/1962 | Palmer et al. | 83/486.1 |
| 3,123,108 | 3/1964 | Gaskell et al. | 83/471.3 |
| 3,392,598 | 7/1968 | Waldorf et al. | 200/328 X |
| 3,457,377 | 7/1969 | Olson | 200/325 X |
| 3,913,437 | 10/1975 | Speer et al. | 83/478 |
| 4,184,395 | 1/1980 | Blachly et al. | 83/486.1 |
| 4,641,557 | 2/1987 | Steiner et al. | 83/486.1 X |

Primary Examiner—Hien H. Phan
Attorney, Agent, or Firm—Sughrue, Mion, Zinn, Macpeak & Seas

[57] ABSTRACT

A radial arm saw, comprising a base having a column mounted thereon with a guide arm supported vertically movably on the column. The guide arm has an inverted U-shape. A saw member slides along the bottom of the guide arm by means of bearings engaging symmetrically arranged longitudinal grooves in the side walls of the arm. The grooves have lower faces inclined downwards towards the centerline. The bearings are similarly inclined and can be adjusted axially. A rectangular U-shaped locking spring is engaged with the saw member support so as to have one of the arm side walls between its arms. When the locking spring is compressed, the saw member is locked along the arm. An integral switch case is fitted within the arm and has an integral bendable cover to cover a recess for a power switch. The switch has an ON-button which can be locked to be inoperative. The back of the switch case and the arm support on the column have corresponding U-shaped grooves for fitting a wire support tray. The arm support includes a clamp guided by a key following a slot in the column. The saw blade is covered by a lower cover that swings upwardly as guided by matching ribs on the lower and upper covers.

12 Claims, 16 Drawing Sheets

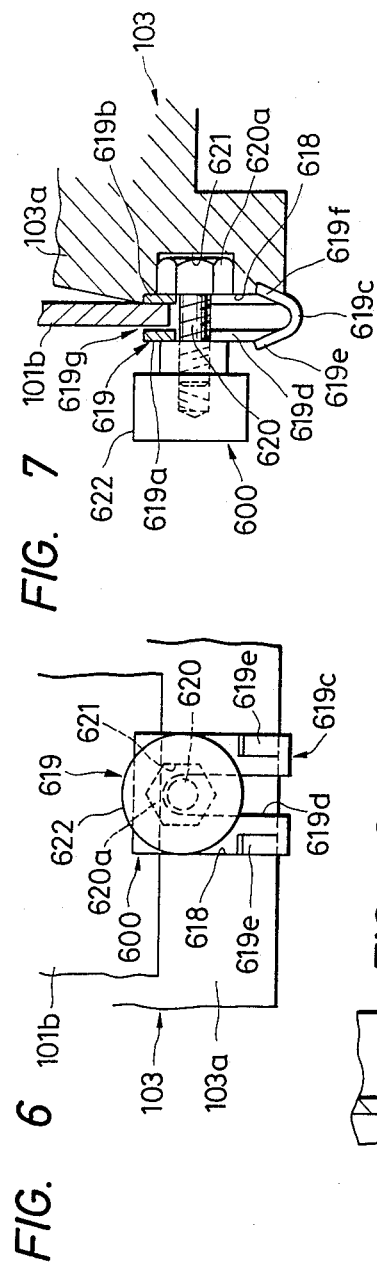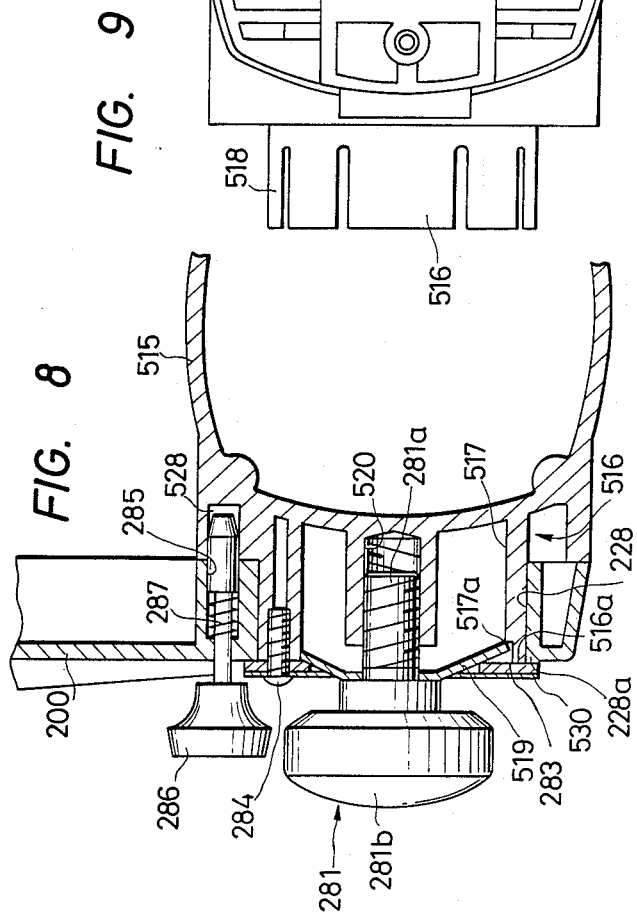

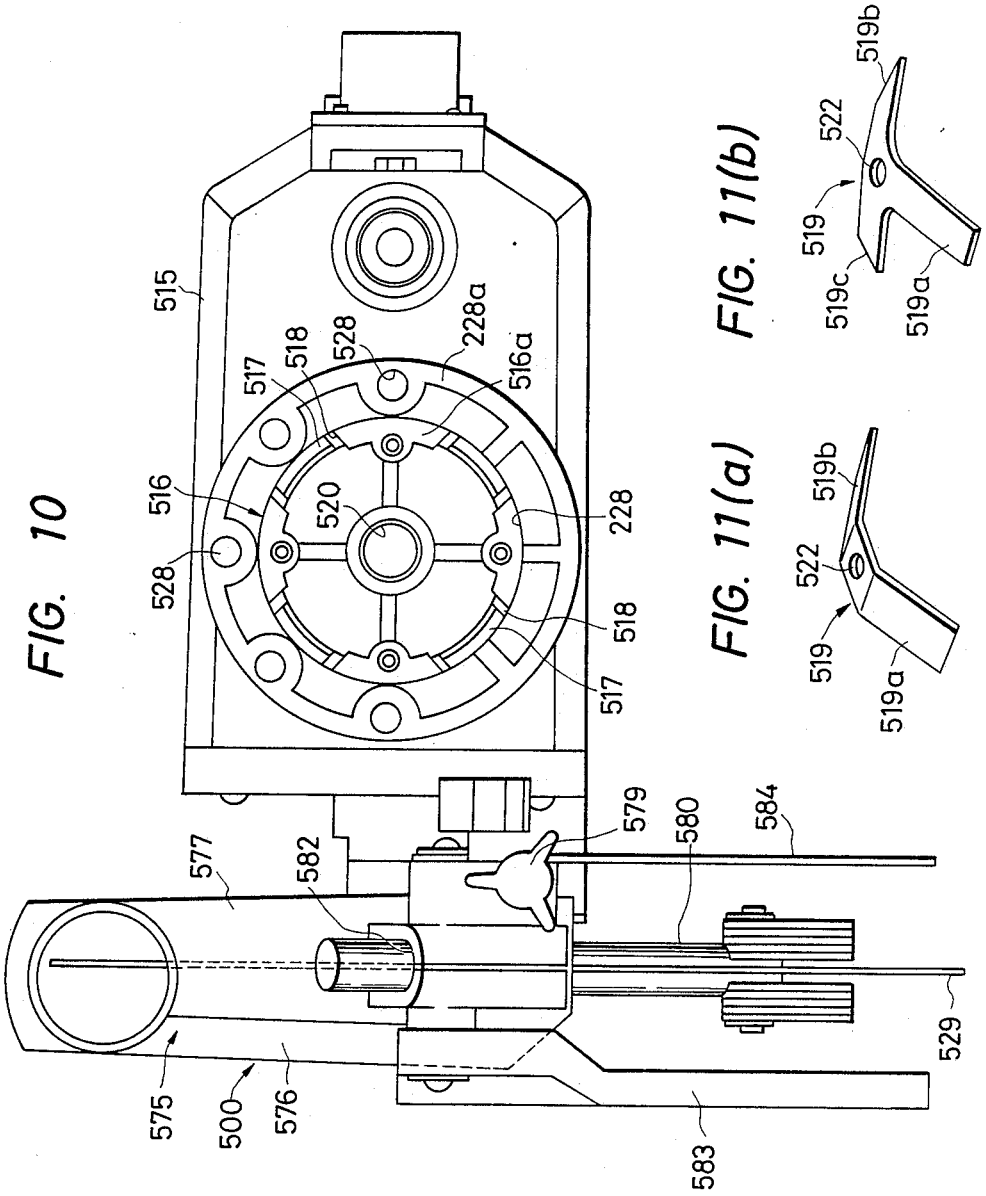

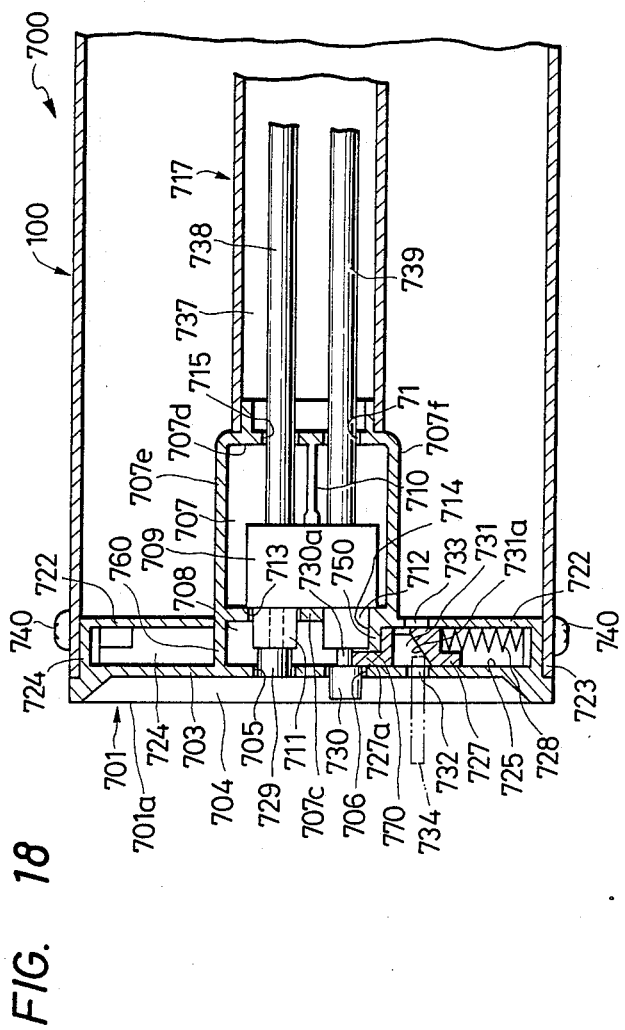
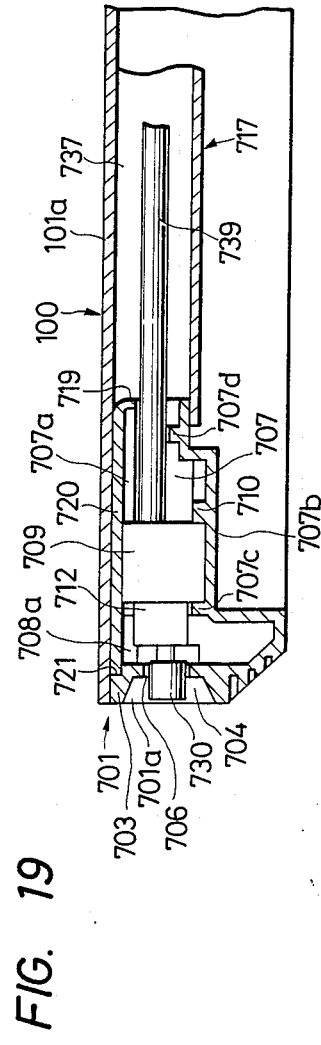

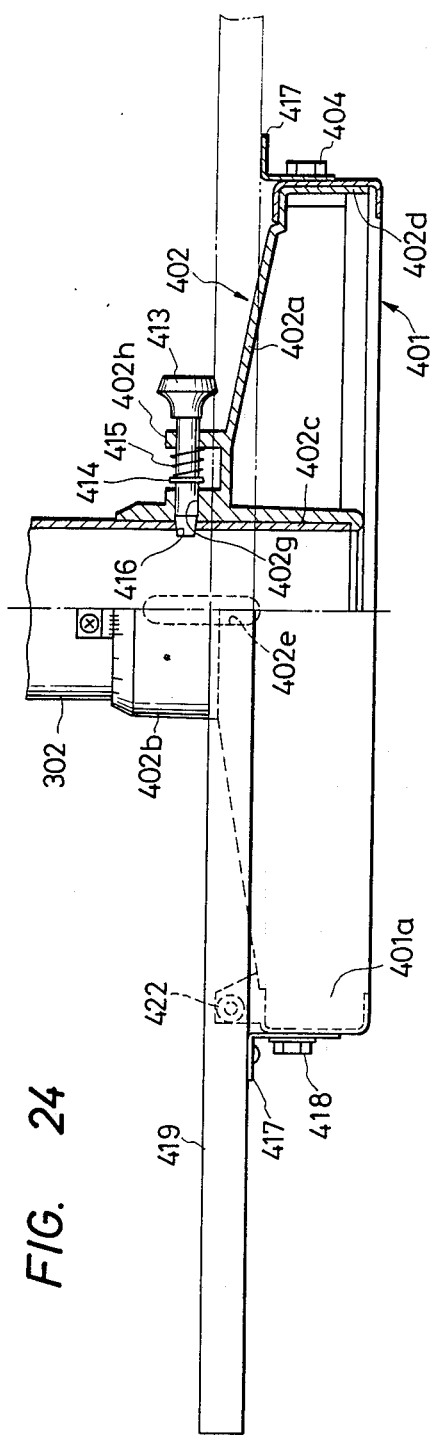
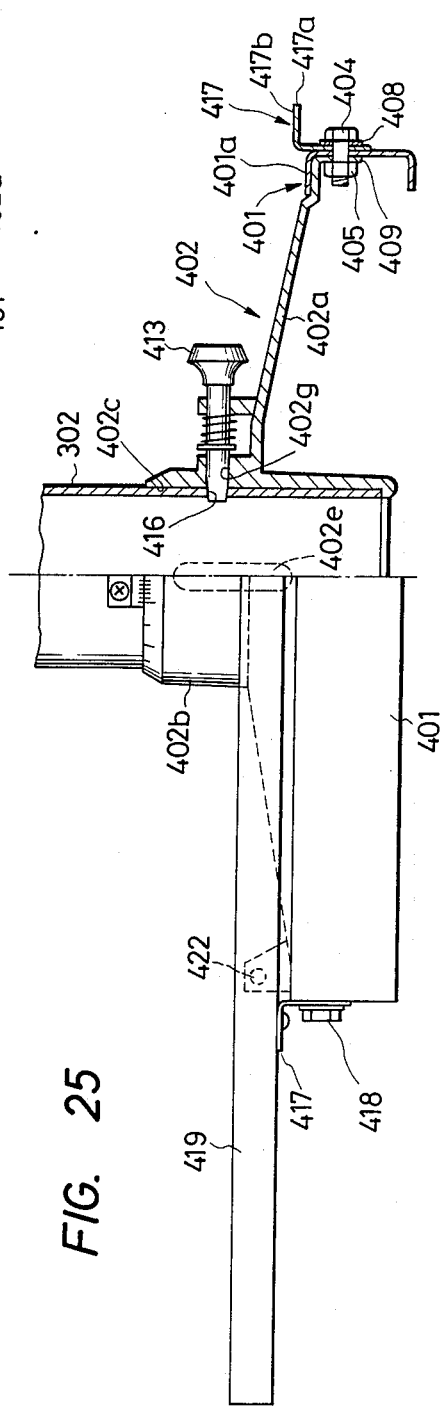
FIG. 24
FIG. 25

RADIAL ARM SAW

BACKGROUND OF THE INVENTION

1. Field of the Invention

The present invention relates to a radial arm saw that comprises a column standing erect on a base, a guide arm supported on the column in such a manner that it is vertically movable by an adjuster, and a saw member that is equipped with a motor and a circular saw blade and which is supported on the guide arm in such a manner that it is movable back and forth and is rotatable in two axial directions.

2. Background of the Invention

The conventional mechanism for sliding the saw member in the radial arm saw has the following construction: two opposing semicircular grooves are formed longitudinally in the inner surface of the side walls of the guide arm. Bearings that match these semicircular grooves are rotatably supported on the side walls of a bearing holder that supports the saw member and which is fitted in the guide arm. These bearings are fitted in the semicircular grooves so that the saw member can be guided along the guide arm in its longitudinal direction.

It is difficult to assemble the blade sliding mechanism in such a manner that no rattling will occur between individual components and that the bearing holder is accurately positioned at a predetermined angle horizontally or in other attitudes. Therefore, after assembling the mechanism, selected components are moved by the necessary amount to absorb any rattling that occurs and the bearing holder is adjusted to be positioned at a predetermined angle. In the prior art, the rattling in the guide section is absorbed by moving the bearings in their radial direction and the inclination of the bearing holder at a small angle is adjusted by moving the bearings in their axial direction. However, biaxial movement of the bearings is time-comsuming and adjusting them properly is a tedious and difficult job that can only be achieved by skilled personnel. In addition, the bearings must be specialty products that have semicircular outer races. Therefore, the conventional blade sliding mechanism for use in a radial arm saw has problems not only in their manufacture but also with regard to economy.

Various constructions are known to be usable as the mechanism for locking the sliding of the saw member in a radial arm saw but they are disadvantageous in one way or another in that they are complicated or require tedious procedures in locking or unlocking the blade.

In the radial arm saw, the guide arm is supported on the base in such a manner that it is vertically slidable by an adjuster, and the saw member is mounted on the guide member in such a manner that it is movable back and forth and is rotatable through adjustment of a vertical shaft. In addition, the blade angle is adjustable with a support shaft perpendicular to the vertical shaft being used as a fulcrum.

The saw member is rotatably supported in such a manner that the blade angle can be altered with respect to a frame that is mounted on the guide in a longitudinally movable and adjustably rotatable manner. In the prior art, a motor case is rotatably supported on the frame with a pinon, the case being pressed with a suitable device such as a cam. This arrangement, however, is complicated and expensive while it fails to achieve speedy adjustment of the blade angle.

The adjuster in the conventional radial arm saw comprises a cylindrical column that is erected on the base and a guide holder that is provided with an elongated slot and which is slidably fitted over the column. Key grooves are formed in the mating surfaces of the guide holder and the column and a key is fitted into these grooves so as to secure the guide holder against rotation. A saw guide arm is supported on the guide holder and a feed screw equipped with a handle is rotatably supported on this guide arm while it is prevented from making any axial movement. The feed screw is threaded into a threaded hole made in the column and by operating the handle to turn the feed screw clockwise or counterclockwise, the guide holder is caused to ascend or descend along the column so as to effect vertical movement of the guide arm.

The guide holder is also equipped with a clamping handle which is operated to clamp the guide holder such that it is reduced in diameter and is securely fixed to the column.

In the prior art, the key grooves formed in the mating surfaces of the guide holder and the column are channel-shaped and a key having squire cross section is fitted in these grooves. Therefore, even if the guide holder provided with an elongated slot is reduced in diameter by clamping with the handle, the engagement between each key groove and the key is not completely free from rattling and the guide holder cannot be completely secured against rotation. Conventionally, a combination of a key retainer and a retaining screw is used to eliminate the rattling between the key grooves and the key but this is not desirable from the viewpoint of reducing the number of parts used. In addition, the key retainer or retaining screw may come off as a result or repeated loosening or tightening operations with the handle that are performed for the purpose of sliding the guide holder vertically or fixing it to the column. Therefore, the adjuster in the conventional radial arm saw has problems not only in manufacture and economy but also with respect to its use.

To ensure utmost safety, the radial arm saw establishes dual insulation of the switch mounting section and this calls for the need to cover the wiring port with an insulator. In the prior art, the switch mounting section consists of a switch case that is covered with a switch cover formed as a separate member and the wiring (i.e., power cables) is mounted in the switch case with a cable retainer or some other fastening device being used to hold the cables in position. This arrangement, however, requires at least three parts, viz., the switch case, the switch cover, and the cable retainer. In addition, different securing means are necessary to attach these parts and much time is spent in manufacturing and assembling the respective parts of the switch mounting section, which is undesirable from an economic viewpoint.

The radial arm saw is equipped with a safety cover for the circular saw blade and other means that provide safety for the operator during the operation of the saw. The motor is turned off when the saw member is moved vertically or the angle of cutting with the circular saw blade is adjusted. An ON-switch button and an OFF-switch button are provided on a selected component, typically on the guide plate, for turning the motor on and off. If these buttons are disposed to protrude from the guide plate such that they can be readily depressed, there is a high likelihood that the motor is turned on as a result of erroneous depression of the ON-switch button during the vertical movement of the blade member or the adjustment of the blade angle. In order to eliminate this potential hazard, it has been proposed that the ON-switch button is locked in an OFF state (i.e, disabled ON mode) but the locking mechanisms so far proposed are complicated in construction or liable to become unlocked accidentally if they are disposed to protrude from the guide plate.

Conventionally, the lead wire cover in the radial arm saw is either formed as an integral part of the guide arm or attached to the latter by a suitable means such as screws. However, the lead wire cover is fabricated without any regard to the switch or other associated parts, so that it cannot be integrated in the assembly in an economic manner and great difficulty if involved in holding power cables in position.

In the radial arm saw, a single column is erected at one end of the base and one end of the guide arm is cantilevered on the column and is slidably supported by an adjuster. The guide arm supports a bearing holder that is fitted to be guided by the arm, a frame that is rotatably supported in the bearing holder by a vertical shaft, and a saw member that is rotatably supported in the frame by a horizontal shaft. The base is required to support these heavy-duty members. There is another reason for the need to provide a rigid structure for the base. The work on the table must be correctly cut with the saw member that is pushed forward with the motor-driven circular saw revolving continuously.

In the prior art, the column retaining holder is mounted on the base that is formed of a solid member which itself has the necessary rigidity. However, this arrangement is inevitably complicated and not only the production cost but also the weight of the base is increased.

In the conventional radial arm saw, the table for holding the work is secured to a base, or table angle irons fixed thereto, with wood screws being inserted through mounting holes in the base or table angles and threaded into the table. However, this mounting method is not efficient and is quite time-consuming since the wood screws must be threaded each time the table is to be mounted or removed whenever the table is dismounted. In addition, low precision in the threading of wood screws may cause incorrect mounting of the table.

In order to ensure a maximum degree of safety, the saw member in the radial arm saw is equipped with not only a safety guard which covers the upper half of the circular saw but also a single lower guard that covers the lower half of the circular saw blade when it is not revolving but which is rotated upward by the work as it is progressively cut with the saw. In the prior art, the lower guard is simply mounted in such a manner that one end thereof is pivotally supported in an appropriate area of the saw member so as to permit the guard to rotate either upwardly or downwardly. But this arrangement often causes irregular rotation of the lower guard or insecure covering of the circular saw as a result of its displacement in a longitudinal direction which is perpendicular to the direction of its rotation or tilting of the lower guard in some other direction.

SUMMARY OF THE INVENTION

The present invention has been accomplished in order to solve the aforementioned problems of the prior art radial arm saw.

An object of the present invention is to provide a saw sliding mechanism in which the corresponding areas of the side walls of a guide arm having a generally U-shaped cross section with its bottom open are provided with right-angled grooves each having a cross section that is generally in the form of an inverted L shaped. The L-shaped grooves are inclined downwardly and inwardly at predetermined angles. The blade sliding mechanism should further have a bearing holder that supports a saw member and is provided on both sides thereof with bearings that are mounted at angles of inclination equal to those of the L-shaped grooves in such a manner that the bearings can be moved axially by adjustment of bearing shafts. The bearings engage the L-shaped grooves.

This blade sliding mechanism enables any rattling of the sliding section to be absorbed and the inclination of the bearing holder to be adjusted easily and quickly by simply displacing the bearings in their axial direction. In addition, this mechanism is simple in construction and can be manufactured at low cost.

Another object of the present invention is to provide a slide locking mechanism for the guide section in a radial arm saw which includes a bearing holder that supports a frame which has a saw member attached thereto and which is fitted in a guide arm in such a manner that it is movable back and forth. A locking spring of the slide locking mechanism is bent into a generally U-shaped form as seen from the side and is fitted to a side wall of the bearing holder in such a manner that a side wall of the guide arm is capable of sliding into the U-shaped opening of the spring which can be compressed by operating a knob that is threaded onto a bolt attached to the bearing holder.

This mechanism for locking the sliding of the bearing holder with respect to the guide plate is simple in construction and accomplishes the locking or unlocking operation in a simple and quick manner.

A still further object of the present invention is to provide a motor case retaining mechanism comprising a motor case mounting frame with a shaft hole made therein. The motor case has a projecting cylindrical shaft that matches the shaft hole. A pair of ribs are formed on the shaft and are capable of being deformed by a small amount in the radial direction. A leaf spring having a mesa-shaped cross section as seen from the side is compressed under the action of a knob screw with the foremost ends of the spring being in engagement with said ribs. The resulting displacement of the leaf spring compressing and deforming the ribs in the radial outward direction to thereby permit the motor case to be retained by the frame.

This mechanism for retaining the motor case with respect to the frame is simple in construction and enables the blade angle to be changed in an easy and reliable manner by simply turning the knob screw. In addition, this retaining mechanism can be manufactured at low cost.

A yet further object of the present invention is to provide a mechanism by which the guide holder fitted over a column in an adjuster is secured against rotation, in which the inner surface of the guide holder is provided with a key groove having a generally semicircular cross section. A semicircular key is fitted in the key groove in such a manner that one or more pins projecting inwardly from the key as integral parts thereof engage with an elongated slot formed in the column. The guide holder has a longitudinal cutout in its peripheral wall that communicates with the key groove in such a manner that the guide holder can be clamped with a lever handle that is mounted on the holder.

This mechanism is simple in construction and yet ensures that the guided holder can be completely secured against rotation without causing any rattling between individual parts.

A still further object of the present invention is to provide a switch case that is an integral combination of a case body and a switch cover. The .case body has a switch receiving recess as an integral part thereof which has U-shaped grooves formed in its rear wall that serve as channels into which power cables are to be inserted, and the switch cover extends from the rear portion of the recess and is connected thereto by thin-walled hinges so that it can be folded over the case body which is capable of being securely fitted in the guide plate with the switch cover being folded over the case body.

This switch case has the advantage that the switch cover can be retained in a predetermined position simultaneously with the mounting of the case body, with the switch and power cables being adequately covered with the switch cover. This permits the switch case to be attached to the guide plate in a simple and easy manner. In addition, this switch case can be molded as a unitary part so that its production rate is increased while its production cost is reduced.

Still another object of the present invention is to provide a switch locking mechanism in which a switch locking plate is confined in the interior of a switch case in such a manner that it is capable of sliding in a direction generally perpendicular to an ON switch button while the locking force of said plate is provided by a spring force. The locking plate is capable of sliding backward in a direction in which the ON switch button is unlocked by overcoming the spring force when an unlocking pin is inserted through a pin insertion hole made in the switch case.

This mechanism is simple in construction and yet ensures reliable locking of the ON switch button. In addition, the locking and unlocking operations can be easily and reliably accomplished by merely withdrawing and re-inserting the unlocking pin. As a further advantage, this locking mechanism is error-proof.

Yet another object of the present invention is to provide a mechanism for mounting a lead wire cover with a U-shaped cross section in a guide arm by fitting the ends of the cover in two grooves that match them and are formed in a face-to-face relationship. One of the grooves is formed in a switch case that is fixed to one end of the guide arm while the other groove is formed in a guide holder for an adjuster that is fixed to the other end of the guide plate.

This mechanism permits the lead wire cover to be mounted simultaneously with other components. In addition, the lead wire cover can be mounted very easily and, hence, at low cost.

A further object of the present invention is to provide a base for a radial arm saw wherein a base body having a U-shaped form as seen from the top and a separately prepared base holder on which a column is to be erected are combined into a unitary assembly by a suitable means such as fastening with screws.

Although this base is simple in construction and can be manufactured at low cost, it affords sufficient rigidity to carry the necessary load.

A still further object of the present invention is to provide a table mounting mechanism in which table angles irons that are fixed to the lateral side portions of a base are provided in their top wall with mounting holes having a shape that resembles a keyhole as seen from the top and which consists of a large-diameter hole potion and a small-width hole portion. The underside of the peripheral edge of the opening of the small-width hole portion are made to have an inclined surface which slopes from the side of the large-diameter hole portion to the end of the small-width hole portion. Wood screws are threaded into the underside of the table in such a manner that the head of each screw protrudes from the underside of the table by an appropriate distance. The head of each wood screw is inserted into the large-diameter hole portion of the corresponding mounting hole and is then allowed to slide toward the small-width hole portion. Thereupon the wood screws are permitted to slide downwardly along the inclined surface until. The table is tightly fixed to the top surface of each table angle iron.

This mechanism eliminates the need to attach or detach wood screws and enables the table to be mounted or dismounted by simple and rapid procedures. The mechanism has the additional advantage or permitting the table to be mounted in a predetermined position without permitting any chance of rattling.

A yet further object of the present invention is to provide a mechanism for mounting lower guards in which an outer lower guard is rotatably mounted at one end about a selected portion of a safety guard and is provided with a circular arched rib that is concentric with the center of rotation of said outer lower guard. The rib engages with a rib formed on the safety guard in such a manner that the arched rib of the safety guard is slidable only in the direction in which the outer lower guard is to rotate so that the outer lower guard will not be displaced in any direction other than the direction of rotation of the outer lower guard.

This lower guard mounting mechanism has the advantage that cutting operations with the circular saw can be accomplished with the outer lower guard rotating in a reliable and steady manner. In addition, the mechanism in which the outer lower guard is rotatably supported on the safety guard at a single point is simple in construction and yet ensures reliable retaining of the outer lower guard.

The first object of the present invention can be attained by a blade sliding mechanism in a radial arm saw comprising a column erected vertically from a base. A guide arm is supported on the column in such a manner that it is vertically movable by an adjuster. A saw member is supported on the guide arm in such a manner that it is movable back and forth and is rotatable into axial directions. The guide arm has a generally U-shaped cross section wit hits bottom open. The corresponding areas of the side walls of the arm are provided with right-angled grooves each having a cross section that is generally in the form of an inverted L-shape. The L-shaped grooves are symmetrically inclined in such a manner that the falling planes and are inclined downwardly and inwardly at equal angles. The guide arm has fitted therein a bearing holder that supports the saw member and which is movable back and forth. Bearings are symmetrically mounted on opposite sides of the bearing holder at equal angels corresponding to the angels of inclination of the L-shaped grooves in such a manner that the bearings can be moved axially by adjustment of bearing shafts. The bearings engage the L-shaped grooves.

The second object of the present invention can be attained by a slide locking mechanism for the guide section in a radial arm saw comprising a column erected on a base. A guide arm is supported on the column in such a manner that it is vertically movable by an adjuster. A bearing holder is guided in the guide arm in such a manner that it is movable back and forth. A frame has a saw member attached thereto and is rotatably supported on the bearing holder by means of a vertical shaft. A square hole is made in a side wall of the bearing holder. A locking spring is fitted in the square hole. The locking spring has a square shape as seen from the front so that it will match the square hole and is bent into as generally U-shaped form as seen from the side. The locking spring is fitted in the square hole in such a manner that a side wall of the guide arm is capable of sliding into the U-shaped opening of the spring. A bolt is supported on the bearing holder at the back of the locking spring in such a manner that the bolt is secured against rotation. The bolt is inserted through an elongated groove formed in the locking spring. A knob is threaded onto the projecting end of the bolt in such a manner that the locking spring can be compressed by allowing the knob to advance toward the spring.

The third object of the present invention can be attained by a mechanism for holding a motor case in a radial arm saw. The mechanism comprises a motor case mounting frame that is mounted on a guide arm by means of a bearing holder in such a manner that it is movable back and forth and is adjustably rotatable about a vertical shaft. A shaft hole is formed in the motor case mounting frame in a direction perpendicular to the vertical axis. A cylindrical shaft projects as an integral element of a motor case and matches the shaft hole. A pair of ribs are formed on the shaft and are capable of being deformed by a small amount in the radial direction. A leaf spring has a knob screw insertion hole in its center and a plurality of hooks that are inclined or bent back from the center so as to provide a section that is mesa-shaped as seen from the side and has a spring action. The leaf spring is compressed under the action of a knob screw with the hooks being in engagement with the ribs. The resulting displacement of the leaf spring compressing and deforming the ribs in the radial outward direction to thereby permit the motor case to be held by said frame.

The fourth object of the present invention can be attained by a mechanism for securing an adjuster against rotation in a radial arm saw. It comprises a column erected on a base. A guide arm is supported on the column in such a manner that it is vertically movable by the adjuster. A saw member is supported by the guide arm in such a manner that it is movable back and forth and is rotatable in two axial directions. The mechanism of the invention includes a guide holder that supports the guide arm and is slidably fitted over the column. The guide holder has a key groove that is formed longitudinally in the inner surface of the guide holder and has a generally semicircular cross section. A semicircular key has a shape that matches the key groove and is fitted in the key groove with one or more pins being in slidable engagement with an elongated slot. The pins project inwardly as integral portions of the key. The guide holder has a longitudinal cutout in its peripheral wall that communicates with the key groove. The mechanism further include a clamping lever handle that is mounted on the guide holder in such a manner that it crosses the cutout at right angles.

The fifth object of the present invention can be attained by a switch case in a radial arm saw. A saw member is supported by a guide arm having a cross section of an inverted U-shape in such a manner that it is movable back and forth on the guide arm and is rotatable in two axial directions. The guide arm is mounted on a column in a vertically movable manner by means of an adjuster. The switch case has a case body that matches the guide arm. The case body has as an integral member thereof a switch receiving recess that is formed in the back of a front wall in which switch button mounting holes are made. The recess has U-shaped grooves formed in its rear wall that serve as channels into which power cables are to be inserted. The recess has as an integral member thereof a switch cover that extends from the rear portion of the recess and which is connected thereto by thin-walled hinges so that it can be folded over the case body. The case body is capable of being securely fitted in the guide arm with the switch cover being folded over said case body.

The sixth object of the present invention can be attained by a switch locking mechanism in a radial arm saw which includes a switch case body, a switch having ON and OFF push buttons, a switch locking plate accommodated in the interior of the switch case body and a spring. The spring urges the locking plate toward the ON switch button so that it will slide in a direction generally perpendicular to the ON switch button so that it can be locked in a disabled ON state. The locking plate is capable of sliding backward in the unlocking direction by overcoming the force of the spring when an unlocking pin is inserted into an unlocking hole through pin insertion holes made in the switch case. The unlocking hole has a pin contact face in the form of an inclined or tapered surface and is made in that area of the switching locking plate which corresponds to each of the pin insertion holes.

The seventh object of the present invention can be achieved by a mechanism for mounting a lead wire cover in a radial arm saw comprising a saw member and a guide arm having a cross section of an inverted U-shape that supports the saw member in such a manner that it is movable back and forth and is rotatable in two axial directions. A column is erected on a base and supports the guide arm in such a manner that it is vertically movable by means of an adjuster. The lead wire cover is formed to have a generally U-shaped cross section. A switch case body is fixed to the front end of the guide plate. A guide holder for the vertical position adjuster is slidably fitted over the column. Grooves that match the ends of said lead wire cover are formed in a face-to-face relationship in the case body and the guide holder, respectively. The lead wire cover is mounted in the guide arm by fitting the ends of the lead wire cover in the grooves.

The eighth object of the present invention can be attained by a base having a base body that is typically made of steel channels and which is bent into a generally U-shaped form as seen from the top. A base holder has a column supporting cylinder formed in an opening in the base body. The base body and the base holder are combined into an integral assembly by suitable means such as fastening with bolts.

The ninth object of the present invention can be attained by a table mounting mechanism in which table angle irons are fixed to the lateral side portions of a base. The top wall of each of the table angle irons is provided with mounting holes that have a keyhole-like shape consisting of a large-diameter hole portion and a small-width hole portion. The mounting holes are capable of being brought into engagement or out of engagement with wood screws that have been threaded into the underside of the table in such a manner that they protrude therefrom by a predetermined distance. The underside of the peripheral edge of the opening of the small-width hole portion of each mounting hole is made to have an inclined surface which slopes from the side of the large-diameter hole portion to the end of the small-width hole portion. The distance from the top face of each of the table angle irons to the descending end of said inclined surface being made equal to or slightly larger than the distance between the underside of the table and the protruding head of each wood screw.

The tenth object of the present invention can be attained by a mechanism for mounting lower guards in a radial saw including a saw member. The mechanism comprises a safety guard that is fixed to a gear case and which generally covers the upper half of a circular saw blade. An outer lower guard is provided at the lower front portion of the safety guard and is rotatably mounted at one end about a selected portion of the safety guard. The outer lower guard has a circular arched rib that is concentric with the center of the rotation of said outer lower guard. The rib engages with a rib formed on the safety guard in such a manner that the rib of the outer lower guard is slidable only in the direction in which said outer lower guard is to rotate, so that said outer lower guard will not be displaced in any direction other than the direction of its rotation.

Figure 5:
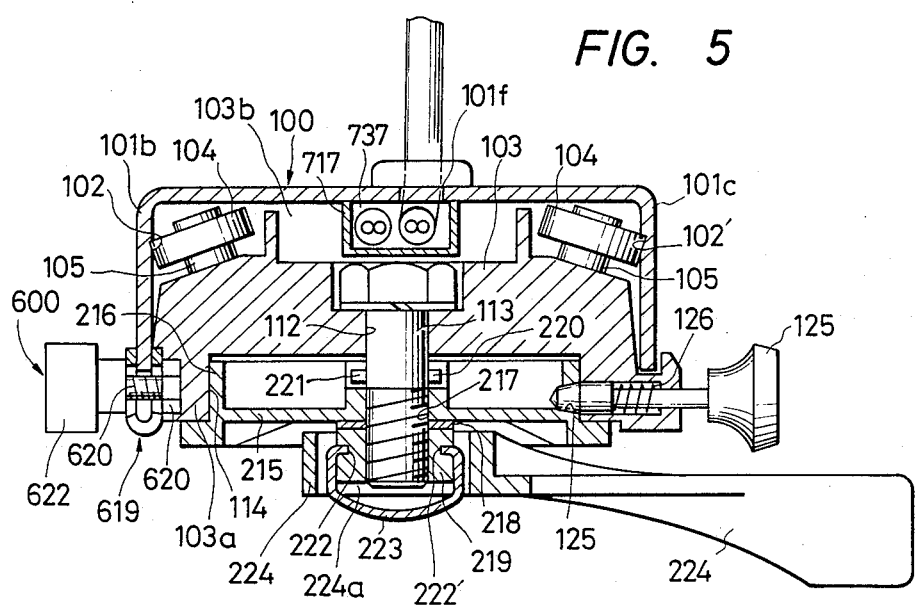

FIG, 5 is a longitudinal section of a mechanism for locking the sliding of a guide member in a radial arm saw according to one embodiment of the present invention;

FIGS. 6 and 7 are a front and a longitudinally sectioned side view, respectively, of the principal part of the mechanism shown in FIG. 5;

FIG. 8 is a longitudinally sectioned side view of a motor case retaining mechanism according to one embodiment of the present invention;

FIG. 9 is a side view of the motor case shown in FIG. 8;

FIG. 10 is a front view of the motor case shown in FIG. 8;

FIGS. 11(a) and (b) are perspective views showing two embodiments of the leaf spring shown in FIG. 8.

Figure 12:
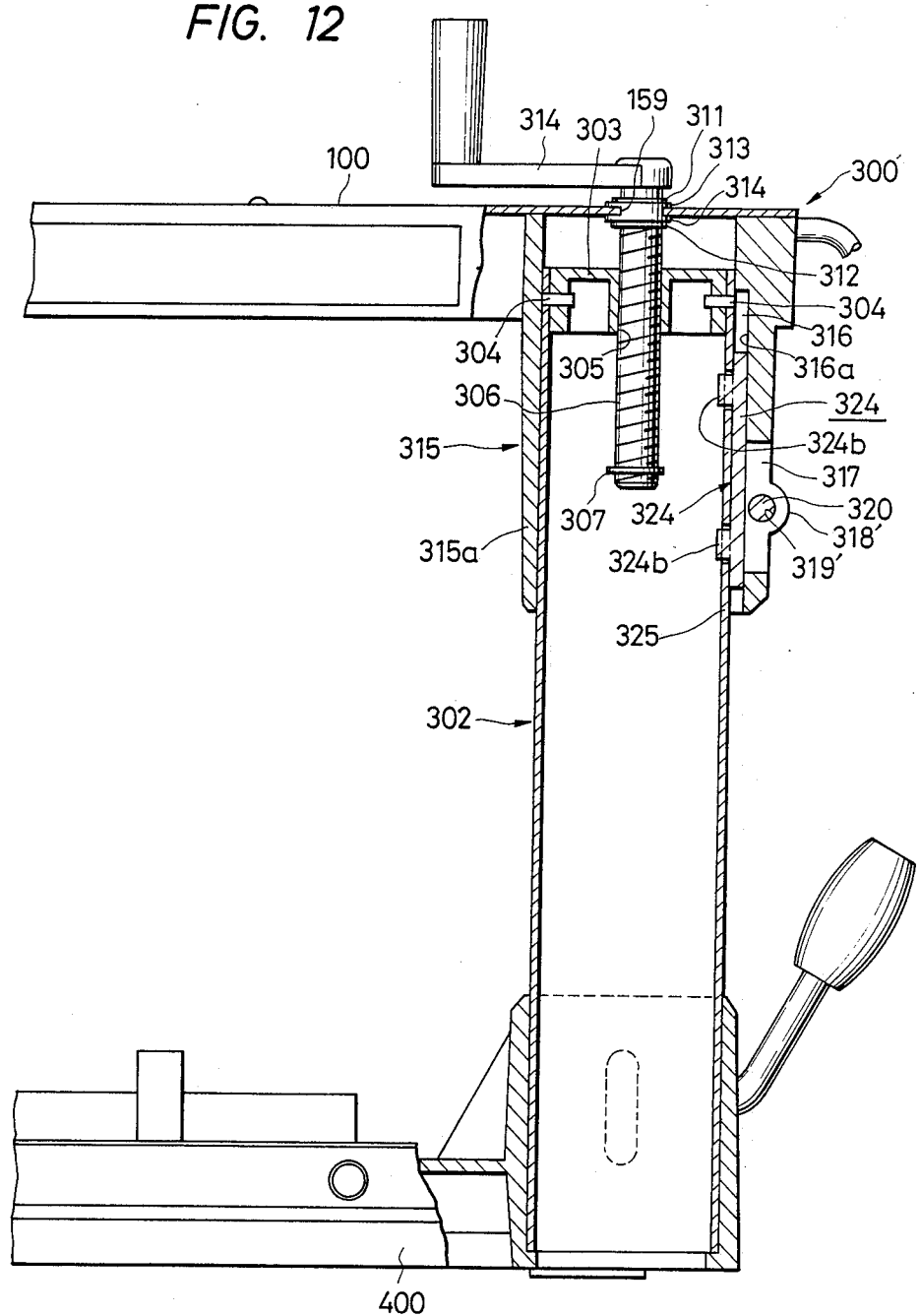
Figure 13:
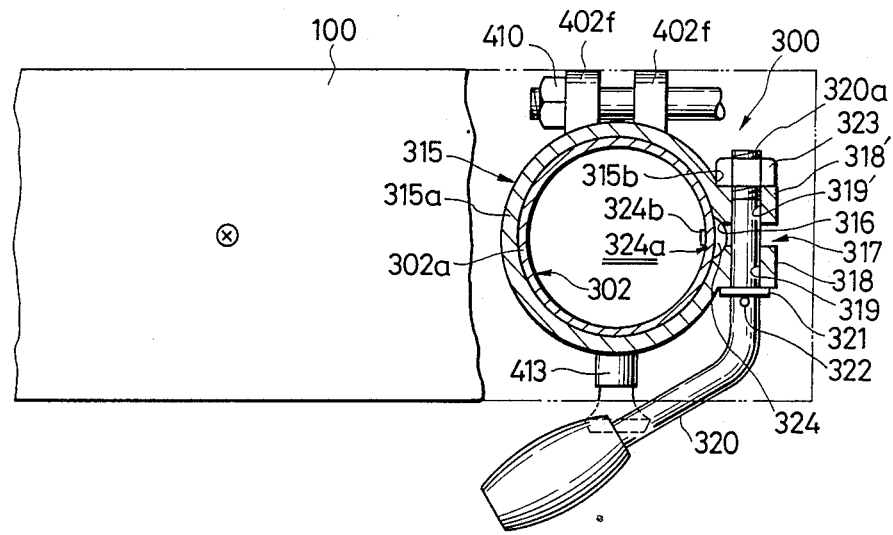
Figure 16:
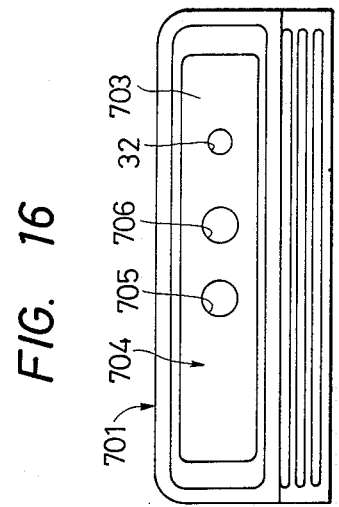
Figure 17:
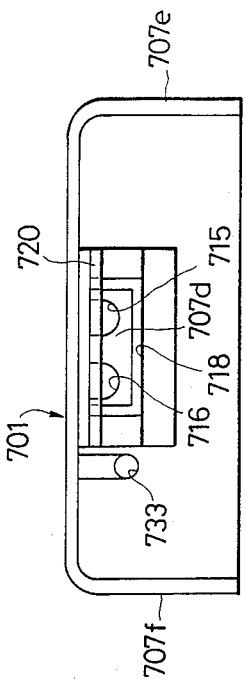
Figure 14:
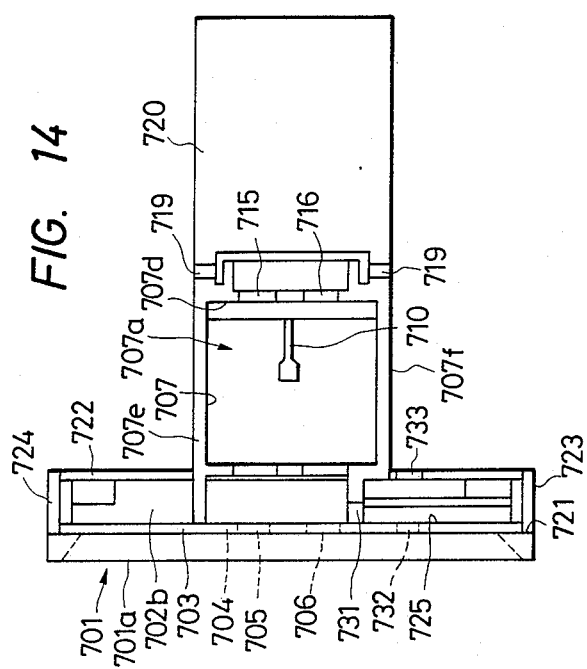
Figure 15:
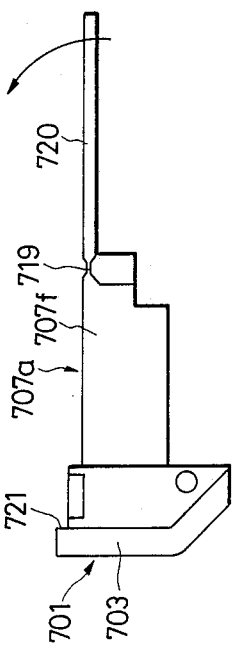
Figure 21:
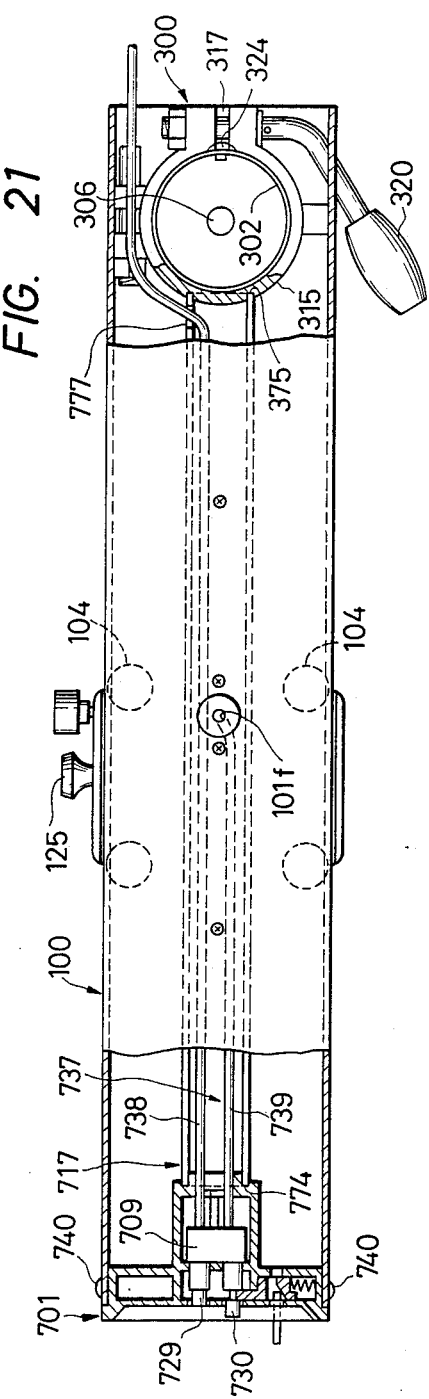
Figure 22:
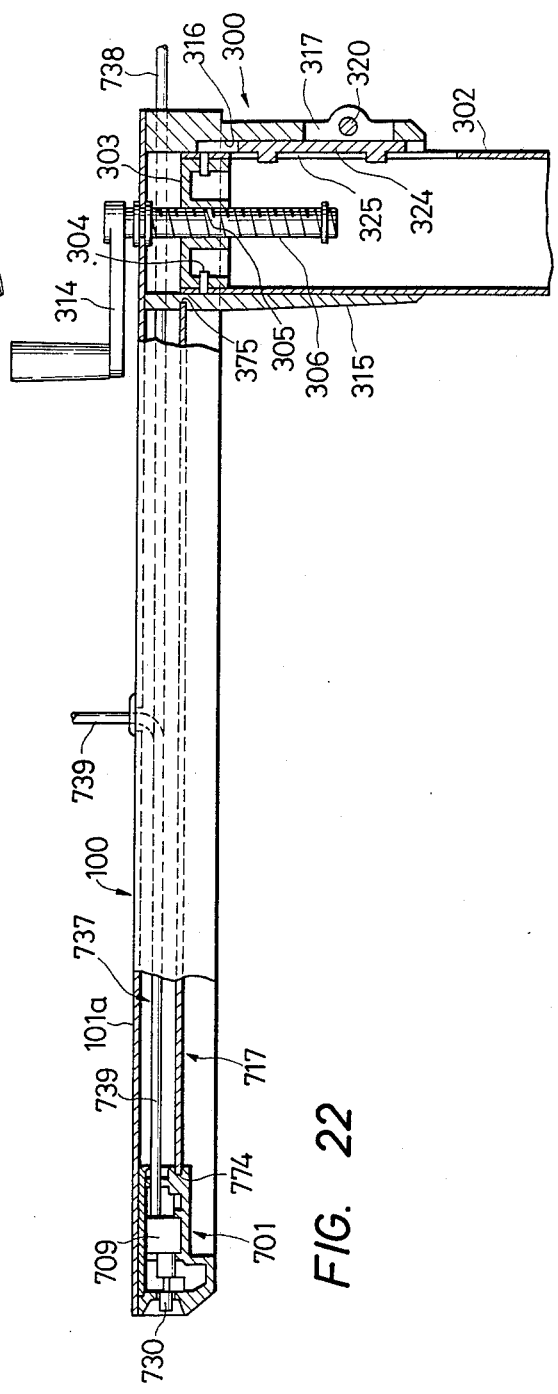

FIG. 12 is a front view showing a longitudinal section of a mechanism for securing an adjuster in a radial arm saw against rotation according to one embodiment of the present invention;

FIG. 13 is a plan view of the mechanism shown in FIG. 12;

FIG. 14 is a plan view showing a switch case in a radial arm saw according to one embodiment of the present invention;

FIG. 15 is a side view of the switch case shown in FIG. 14;

FIG. 16 is a front view of the switch case shown in FIG. 14;

FIG. 17 is a rear view of the switch case shown in FIG. 14;

FIGS. 18 and 19 are a cross-sectional and a longitudinally sectioned side view, respectively, of the switch case of FIG. 14 when it is in use;

FIGS. 20(a), (b) and (c) are a front view, a cross-sectional view and a side view of a switch locking plate used in a switch locking mechanism according to one embodiment of the present invention;

FIG. 21 is a plan view, with partially exposed sections, of a lead wire cover mounting mechanism for use in a radial arm saw according to one embodiment of the present invention;

FIG. 22 is a longitudinally sectioned side view of the mechanism shown in FIG. 21, with partially exposed sections.

Figure 23:
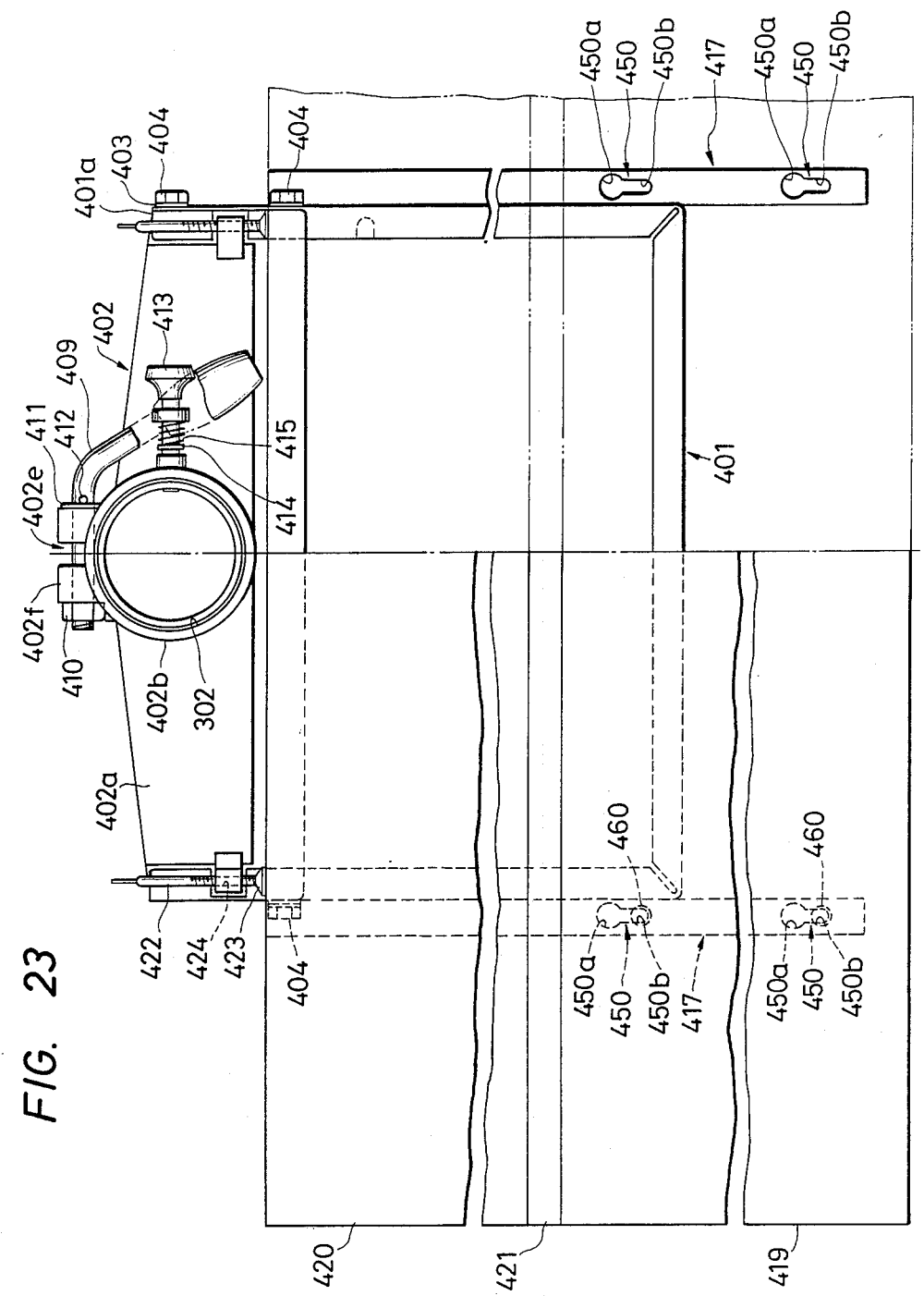

FIG. 23 is a plan view showing a base for a radial arm saw according to one embodiment of the present invention;

FIG. 24 is a front view of a section that is taken along the center line of the base shown in FIG. 23.

Figure 26A:
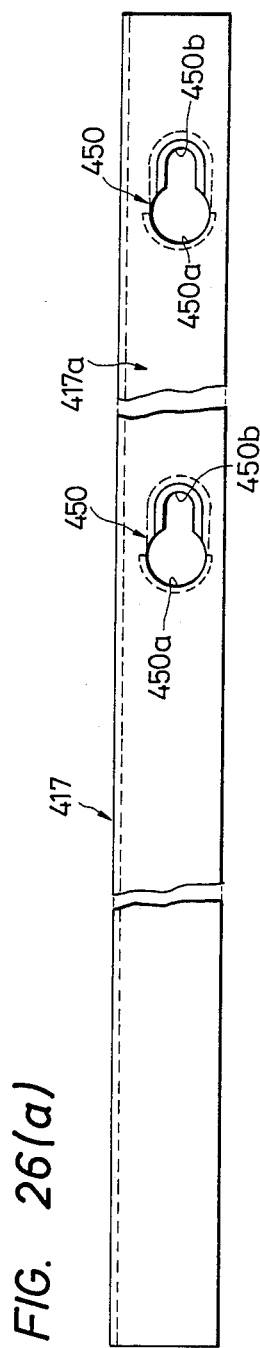
Figure 26B:
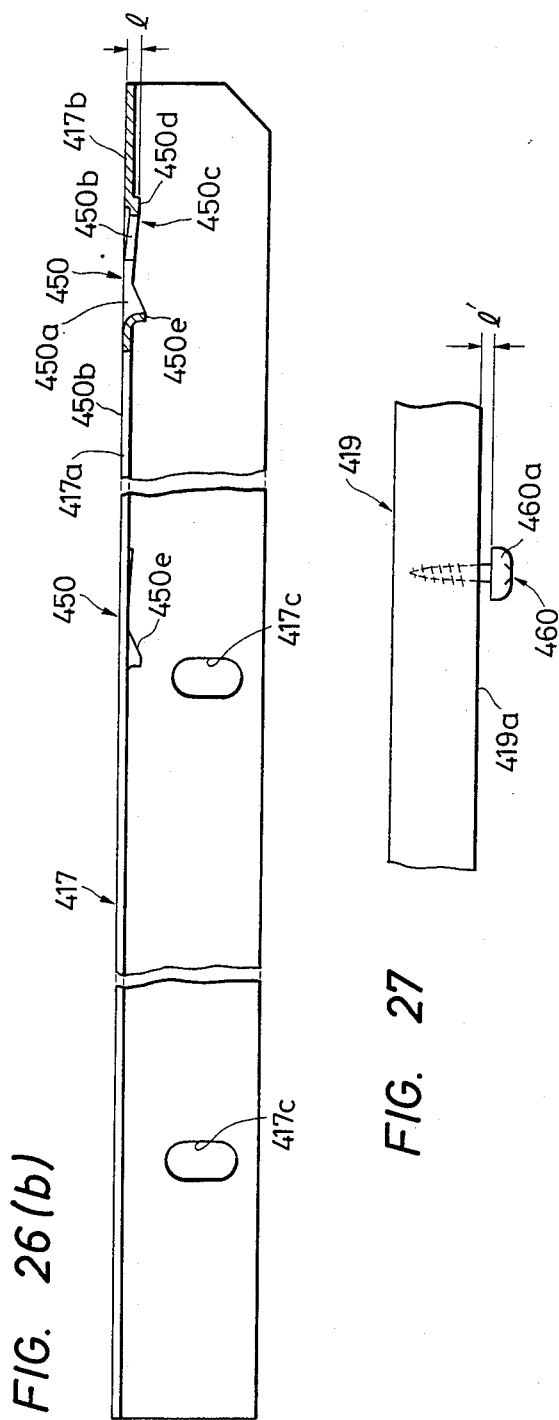
Figure 27:
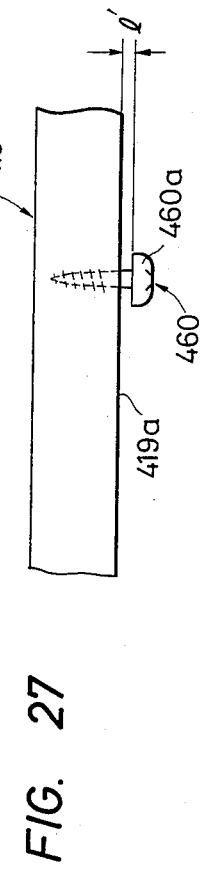
Figure 28:
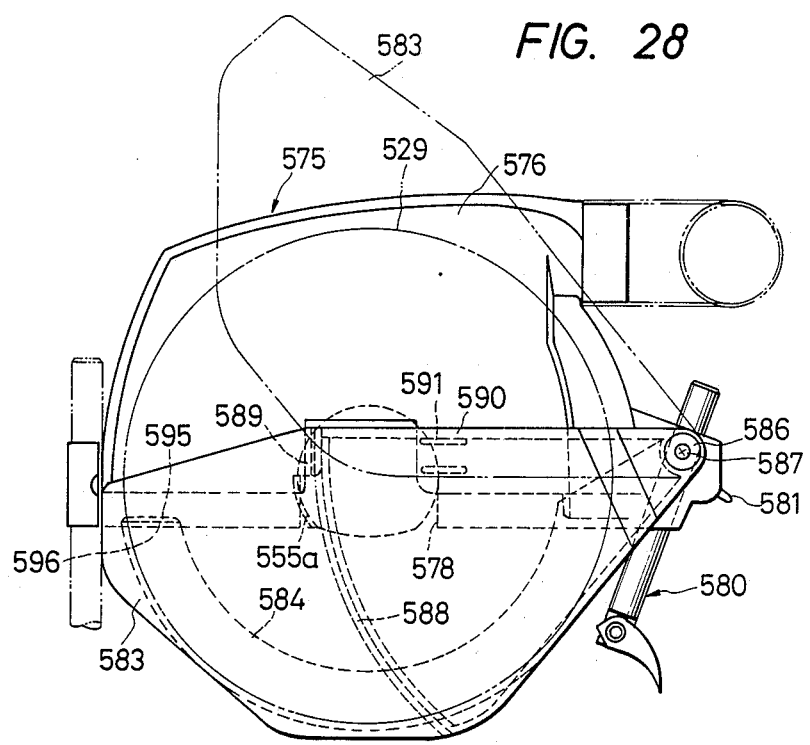
Figure 29:
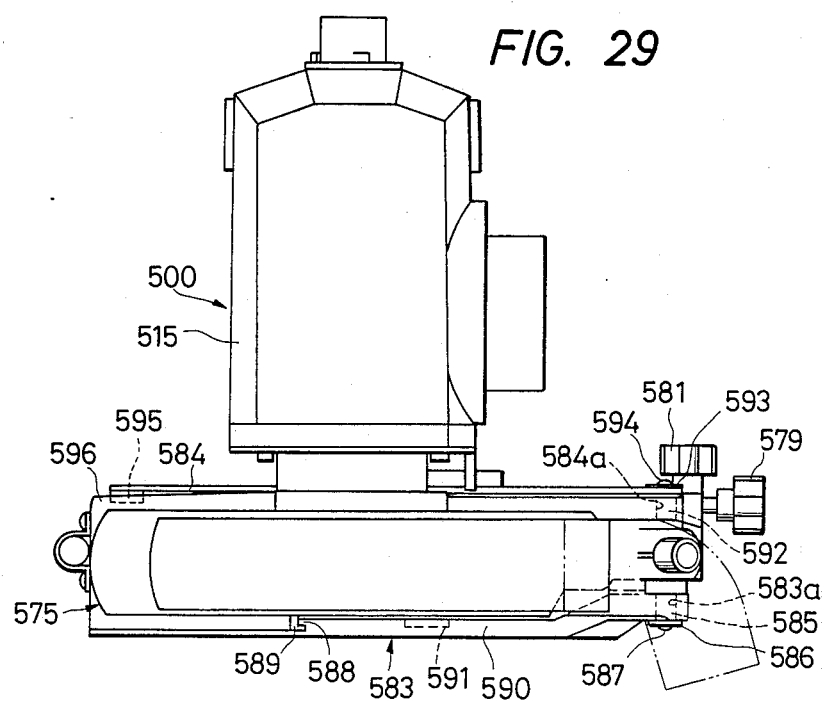

FIG. 25 is also a front view of a section that is taken along the center line of the base shown in FIG. 23;

FIGS. 26(a) and (b) are a plan and a side view, respectively, of a table mounting mechanism according to one embodiment of the present invention, with part of the table angles iron being exposed;

FIG. 27 is partial side view of the table and a wood screw used in the mechanism shown in FIG. 26;

FIG. 28 is a front view showing a lower guard mounting mechanism for use in a radial arm saw according to one embodiment of the present invention;

FIG. 29 is a plan view of the mechanism shown in FIG. 28; and

Figure 30:
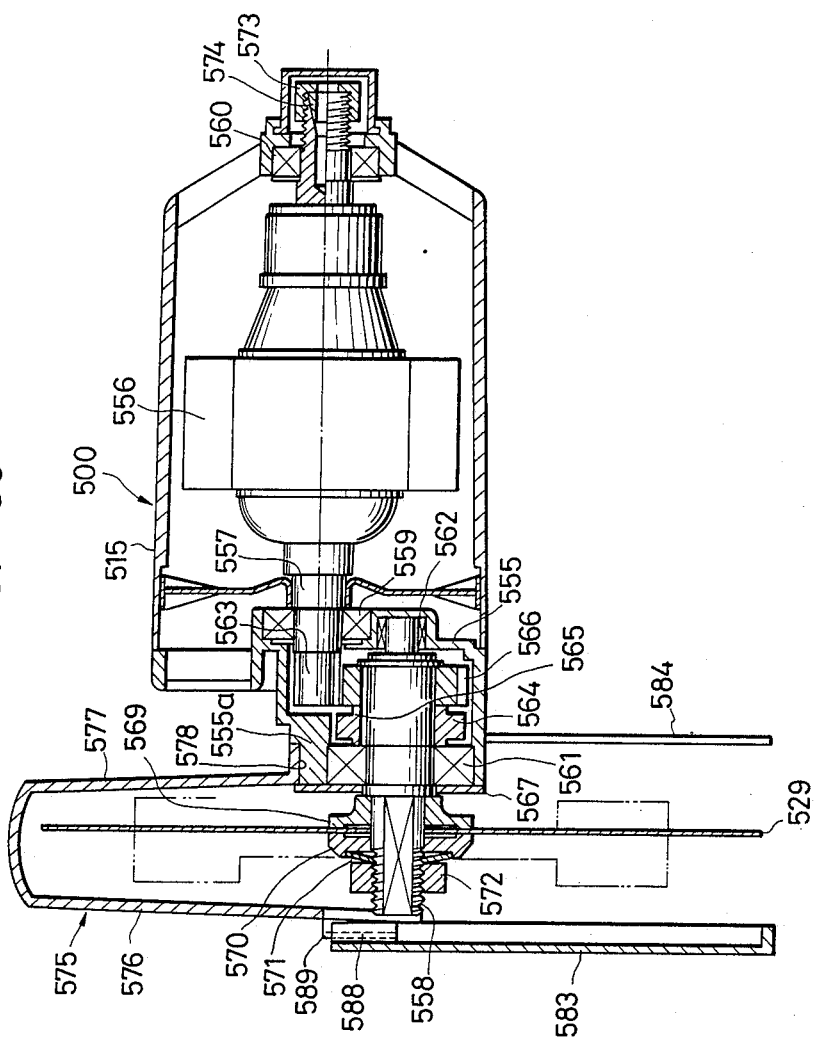

FIG. 30 is a longitudinally sectioned side view of the mechanism shown in FIG. 28.

DETAILED DESCRIPTION OF THE PREFERRED EMBODIMENTS

Figure 1:
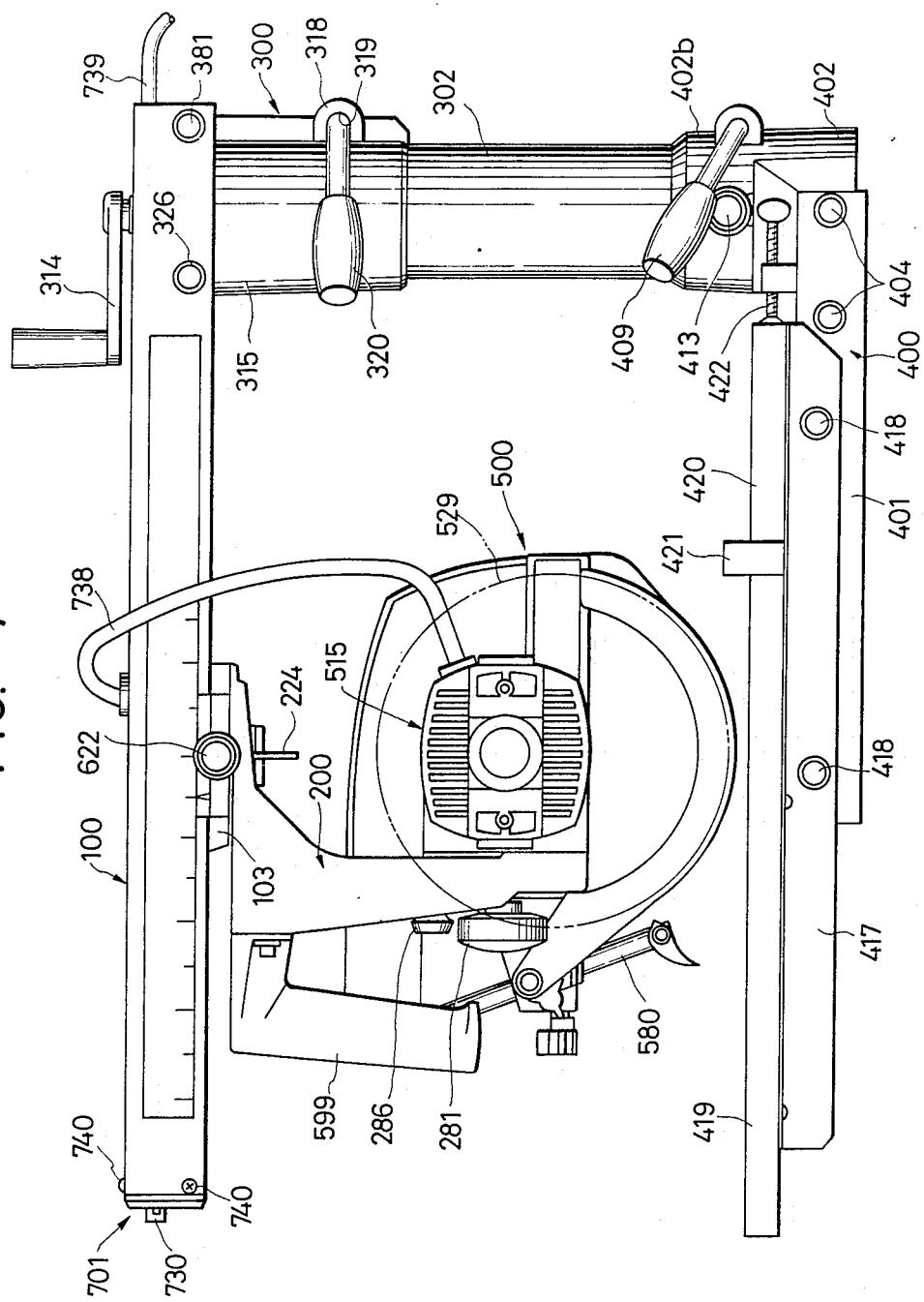
FIG. 1 is a side view of a radial arm saw equipped with the mechanism of the present invention for sliding the saw member.

As shown in FIG. 1, the radial arm saw of the present invention includes a saw member 500 supported on a mounting frame 200. A guide arm 100 supports and guides the mounting frame 200 to move back and forth (in the leftward or rightward direction in FIG. 1). An adjuster 300 pivotally supports one end of the guide arm 100 and furthermore supports the guide arm 100 in a vertically movable manner. A base 400 secures perpendicularly a column 302 on which the adjuster 300 rides.

The guide arm 100 according to the present invention is hereinafter described with reference to FIGS. 1 to 3. The guide arm 100, which is typically formed of a U-shaped channel member facing downward, is composed of a top wall 101a and two side walls 101b and 101c that are bent downwardly at a right angle from the left and right side edges of the top wall 101a. The guide arm 100 has a generally U-shaped cross section with its bottom open. The corresponding areas of the side walls 101b and 101c are provided with longitudinally extending inclined L-shaped grooves 102 and 102' that face each other.

The L-shaped groove 102 or 102', which is formed in the inner surface of the side wall 101b or 101c is defined by a downwardly facing plane 102a or 102'a defining the top of the groove 102 or 102' and a descending plane 102b or 102'b that extends down from one end of the downwardly facing plane 102a or 102'a at a right angle. In order for them to be inclined downwardly and inwardly, the descending planes 102b and 102'b are inclined at equal angles of $\alpha$ and $\alpha'$ with respect to a center line a through the guide arm 100 and a bearing holder to be described below.

In a preferable embodiment, each of the angles $\alpha$ and $\alpha'$ is set at 18°–25° so that the two descending planes 102b and 102'b form an angle $\beta$ of 36°–50°.

The guide arm 100 is equipped with a bearing holder 103 in its longitudinal direction which is slidably fitted in the guide arm 100. At both longitudinal ends of the left side of the bearing holder 103, a bearing 104 is rotatably mounted on a bearing axle 105. Similarly, at each longitudinal end of the right side of the bearing holder 103, a bearing 104' is rotatably mounted on a bearing axle 105'. Therefore, the bearing holder 103 contains four bearings (only two of them are shown in FIG. 3) that are inclined at an angle $\theta$ or $\theta'$ which is equal to the angle $\alpha$ or $\alpha'$ at which the L-shaped groove 102 or 102' is inclined.

The bearing axle 105 or 105' has a male threaded portion 105a or 105'a and the bearing 104 or 104' is rotatably supported on top of the bearing axle 105 or 105' such that it will not move in its axial direction. A threaded hole 106 or 106' is machined through the left or right side of the bearing holder 103 at an angle of $\theta$ or $\theta'$ with respect to the center line a. The bearing axle 105 or 105' is threaded into the hole 106 or 106'. By advancing or retreating the bearing axle 105 or 105', the bearing 104 or 104' can be adjustably moved in its axial direction. A lock nut 107 or 107' is threaded onto the male threaded portion 105a or 105'a so as to secure the bearing axle 105 or 105' and the bearing 104 or 104' at an adjusted position or height.

In short, the bearings 104 and 104' are in respective engagement with the L-shaped grooves 102 and 102' in the guide arm 100 so that the bearing holder 103 is supported on the guide plate 100 in such a manner that it is slidable back and forth. The top surface 104a or 104'a of the bearing 104 or 104' engages the downwardly facing plane 102a or 102'a of the L-shaped groove 102 or 102' while its circumferential surface 104b of 104'b engages the inclined descending or plane 102b or 102'b. Through adjustment of the axial movement of the bearings 104 and 104' by means of the bearing axles 105 and 105', respectively, any rattling that the bearing holder 103 may experience in the thrust direction with respect to the L-shaped grooves 102 and 102' can be eliminated. At the same time, the bearing holder 103 can be positioned with a small angle of inclination being maintained with respect to the L-shaped grooves 102 and 102'.

Figure 4:
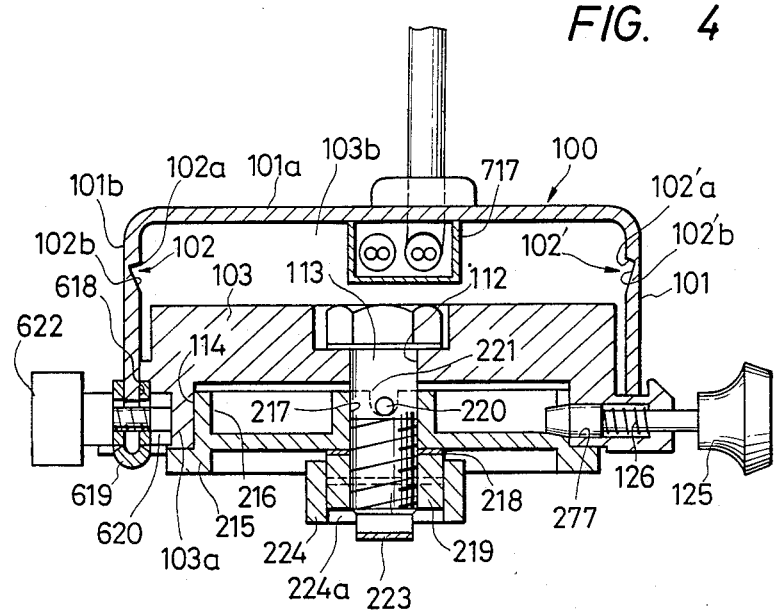
FIG. 4 is a cross-sectional view of the mechanism of FIG. 2 looking in the direction of the arrow IV—IV.

As shown in FIG. 4, a square hole 618 is formed in one side wall 103a of the bearing holder 103 and a U-shaped locking spring 619 is placed over that hole 618. A hexagonal bolt 620 with its head secured to the side of the bearing holder 103 has its threaded end inserted through a hole in the locking springs 619 and threaded into a exterior knob 622. When the knob 622 is rotated against the locking spring 619, the side wall 101b of the guide arm 100 in the U-shaped opening of the locking spring 619 is clamped by its legs so as to lock the bearing holder 103 (i.e., prevent it from sliding along the guide arm 100).

This mechanism for locking the sliding motion of the bearing holder 103 is hereunder described in more detail with reference to FIGS. 5 to 7 in which the mechanism is generally indicated at 600.

The square hole 618 is formed laterally in the side wall 103a of the bearing holder 103. The locking spring 619 has a shape that matches this square hole 618. Therefore, the spring 619 has a square front and is generally U-shaped as seen from the side. In order to make this locking spring 619, a resilient rectangular metal plate is bent along its center into a U-shape that consists of a circular arc 619c having an appropriate curvature and two legs, 619a and 619b which are spaced apart by a distance sufficient to receive the side wall 101b of the guide plate 100. The two legs 619a and 619b provide the spring action. A groove 619d is formed along the center of each leg 619a and 619b. The groove 619d starts from just below the top leg 619a or 619b and extends to the curved portion 619c at its lower end. On each side of the lower end of the leg 619a or 619b, a cut which has generally inverted L-shape as seen from the front is made to form a resilient tab 619e or 619f that is pulled outwardly.

The bottom of the square hole 618 in the side wall 103a of the bearing hole 103 is provided with a lateral hexagonal hole 621 that matches a head 620a of the hexagonal bolt 620. By fitting the head 620a of the hexagonal bolt 620 into the hexagonal hole 621, the bolt 620 can be secured against rotation and retained laterally on the bearing holder 103. The locking spring 619 is secured, with its open end facing up, to the square hole 618 in the bearing holder 103 with the hexagonal bolt 620 being inserted through the elongated groove 619 while the side wall 101b of the guide arm 100 is inserted into the upper part of the U-shaped opening 619g. The knob 622 is retractably threaded onto that threaded portion of the hexagonal bolt 620 which projects from the front face of the locking spring 619. If the knob 622 is advanced toward the guide arm 100, the locking spring 619 is compressed and the width of the U-shaped opening 619g is reduced so that the side wall 101b of the guide arm 100 is firmly secured between the legs 619a and 619b of the locking spring 619. As a result, the bearing holder 103 is locked with respect to the guide arm 100 so that it will not slide along the guide arm 100 in either direction.

The bearing holder 103 has a central through-hole 112 through which a vertical shaft 113 in the form of a hexagonal bolt is rotatably inserted. The underside of the bearing holder 103 is provided with a wide and shallow shaft hole 114 that is concentric with the through-hole 112. A short, wide shaft 216 projecting upward from a lower frame 215 is fitted into this shaft hole 114.

The frame 215 also has a central through-hole 217 through which the vertical bolt 113 is inserted. By threading a hexagonal nut 219 onto the lower end of the vertical bolt 113 with a thrust washer 218 being provided therebetween, the frame 215 can be rotatably supported on the bearing holder 103.

The vertical bolt 113 has a pin 220 attached transversally at a right angle thereto, in an unthreaded central portion of its shaft. This pin 220 is fitted into a U-shaped groove 221 in the frame 215 so as to secure the bolt 113 and lower frame 215 against rotation when the bolt 113 is tightened.

The outer surface of the lower hexagonal nut 219 is provided with diametrically opposed recesses 222 and 222' which engage a clamping spring 223 having a generally U-shaped longitudinal section. The hexagonal nut 219 also engages a clamping lever 224 with an hexagonal hole 224a that matches the contour of the hexagonal nut 219. As a result, the lever 224 and the hexagonal nut 219 form an integral unit that is rotatably supported by the clamping spring 223. By depressing the center of the clamping spring 223, it is disengaged from the grooves 222 and 222' and the clamping lever 224 can be detached from or reattached to the hexagonal nut 219. Therefore, by tightening this lever 224, the lower frame 215 is secured to the bearing holder 102 and by loosening it, the frame 215 becomes freely rotatable about the shaft of the bolt vertical 113.

As shown in FIGS. 4 and 5, a stopper pin 125 is provided on one side of the bearing holder 103 in such a manner that it is capable of sliding against a loaded compression spring 126 and with the spring action being exerted in the axial inward direction on the stopper pin 125. A plurality of stopper holes 227 are provided at appropriate locations of the lower frame 215 and its rotation is restricted when the stopper pin 125 is fitted into any of these stopper holes.

The saw mounting frame 200 and the motor case holding means of the radial arm saw of the present invention are hereunder described with reference to FIGS. 1, 2 and 8 to 11(b).

As shown in FIG. 1, the column 302 is erected vertically from one end of the base 400 and the guide arm 100 is supported on the column 302 in such a manner that it is vertically movable by the adjuster 300. The saw member 500 is supported on the guide arm 100 by means of the mounting frame 200 in such a manner that it is movable back and forth and is furthermore rotatable about two axes.

Figure 2:
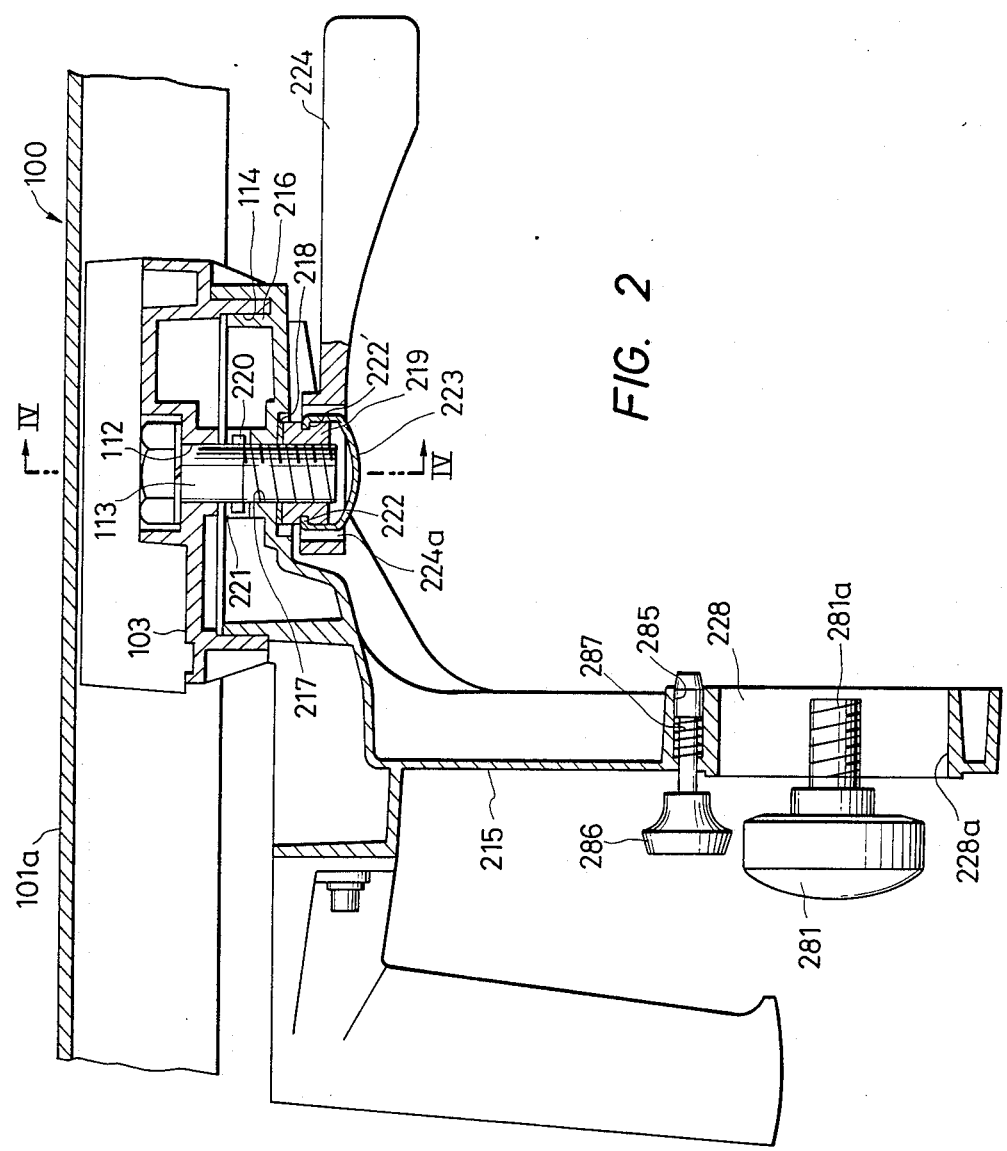
FIG. 2 is a longitudinally sectioned side view showing the saw sliding mechanism according to one embodiment of the present invention.
Figure 3:
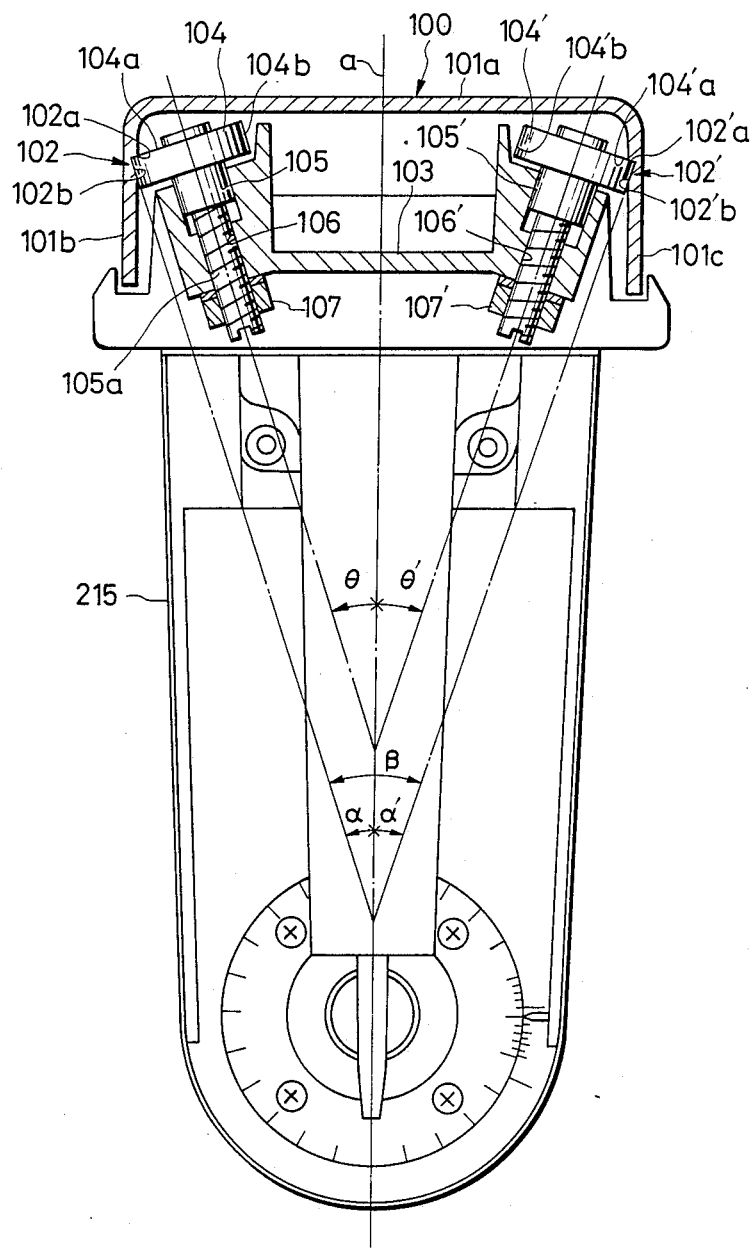
FIG. 3 is a front view showing a cross section of the mechanism depicted in FIG. 2.

As shown in FIG. 2, the downwardly depending end of the lower frame 215 has a shaft hole 228 that is made perpendicular to the axis of the vertical bolt 113. As shown in FIGS. 8 to 11(b), one side of a motor case 515 has a projecting cylindrical shaft 516 that matches the shaft hole 228.

As shown in FIGS. 8 to 10, the motor case shaft 516 has symmetrically arranged pairs of ribs 517 that can be deformed by a small amount in the radial direction. The ribs 517 are formed by making axial slits 518 in the peripheral wall of the motor case shaft 516, with one slit 518 being spaced from an adjacent one by an appropriate distance in the circumferential direction. In the embodiment shown, two pairs of diametrical ribs 517 are formed and this assumes the use of a leaf spring 519 which, as shown in FIG. 11(a), has two symmetrical hooks 519a and 519b. The leaf spring 519 may be a crown leaf spring which, as shown in FIG. 11(b), has three equiangularly spaced hooks 519a, 519b and 519c. In this case, three ribs 517 make a pair and at least one or two pairs of ribs are to be formed. A step 517a is desirably formed on the inside edge of the end of each rib 517 for providing engagement with the hook 519a, 519b or 519c.

A threaded hole 520 is made in the center of the motor case shaft 516 and a clamping knob screw 281 is threaded into that hole 520. The leaf spring 519 is formed of a resilient metal plate and has a central hole 522 through which the knob screw 281 is to be loosely inserted. The leaf spring 519 has two or three hooks 519a, 519b and 519c that are inclined back at a suitable angle or bent back at a suitable curvature so as to provide a central section that is mesa-shaped as seen from the side and provides the spring action when compressed inwardly.

After attaching the motor case 515 to the mounting frame 200 by fitting the motor case shaft 516 into the shaft hole 228, the leaf spring 519 is placed in contact with the end of the motor case shaft 516. The hooks 519a, 519b and possibly 519c are brought into engagement with the ribs 517 at their steps 517a. Thereafter, a common annular slide plate 283 (FIG. 8) is placed over a periphery 228a of the opening of the shaft hole 228 and over an end face 516a of the motor case shaft 516, as shown in FIG. 10. The slide plate 283 is secured to the end face 516a with tap-tight screws 284, as shown in FIG. 8, so that the leaf spring 519 will not come off the ribs 517. Then, the knob screw 281 is inserted through the hole 522 in the leaf spring 519 and a threaded rod 281a of the knob screw 281 is threaded into a threaded hole 520 in the motor case 515. By depressing the center of the leaf spring 519 axially inwardly with the knob portion 281b of the knob 281, the leaf spring 519 is deformed into a flat shape by overcoming its own spring force. As a result, the ribs 517 are deformed radially and outwardly in a direction in which the diameter of the motor case shaft 516 is increased, and this allows the motor case 515 to be detachably fixed to the frame 200.

As shown in FIG. 8, the mounting frame 200 for supporting the saw member 500 is also provided with a through-hole 285 that extends parallel to the shaft hole 228. A stopper pin 286 is biased by a compression spring 287 and is slidably inserted into that hole 285 in such a manner that it is biased toward the motor case 515 by the force of the spring 287. The area of the motor case 515 that corresponds to the periphery 228a of the opening of the motor case shaft hole 228 is provided with a plurality of stopper holes 528 that are arranged in the circumferential direction at suitable intervals and each of which has a shape that matches the stopper pin 286. The stopper pin 286 can engage any one of these stopper holes 528 so as to restrict the rotation of the motor case 515 with respect to the frame 200.

In an area around the motor case shaft hole 228 in the mounting frame 200, a dial 530 (FIG. 8) is provided for indicating the rotational angle of the shaft 516, or the bevel angle of the teeth on a circular saw 529 that is driven with a motor (not shown) contained in the motor case 515.

The means for securing the adjuster against rotation in the radial arm saw of the present invention is hereunder described with reference to FIGS. 12 and 13. The cylindrical column 302 is erected at one end of the base 400 to which its lower end is fixed by a known fixing mechanism. A screw holder 303 is fixed in the upper end of the column 302 by means of spring pins 304.

A threaded hole 305 is vertically threaded through the center of the screw holder 303 and a feed screw rod 306 is threaded into the hole 305 in such a manner that it can be advanced or retracted in a vertical direction. An anti-slip stop ring 307 is fixed to the lower end of the feed screw rod 306. The upper end of the screw rod 306 is inserted through a mounting hole 159 in the guide arm 100. Two stop rings 311 and 312, the former being on the top of the guide arm 100 and the latter being on the underside of the arm 100, are fixed to the upper end of the screw rod 306 with a thrust washer 313 being placed under the upper stop ring 311 and a thrust washer 314 on top of the lower stop ring 312. By this arrangement, the feed screw rod 306 is rotatably supported on the guide arm 100.

The topmost end of the feed screw rod 306 projects above the guide arm 100 and handle 314 is fixed to this end by a known device such as a key or a screw. A cylindrical guide holder 315 having an inside diameter that matches the outside diameter of the column 302 is slidably fitted over the column 302 and the guide arm 100 is secured to the upper end of the guide holder 315 with a suitable device such as a bolt 326 (FIG. 1).

The inner surface of the guide holder 315 is provided with a key groove 316 in an appropriate area. The key groove 316 has generally semicircular cross section and extends longitudinally down to the lower end of the guide holder 315. A longitudinal cutout 317 that communicates with the key groove 316 is made in the lower part of the peripheral wall 315a of the guide holder 315. The inside end of the cutout 317 is open to generally the middle portion of an arched surface 316a of the key groove 316. The width and length of the cutout 317 are so selected they can be decreased by operation of the guide holder 315 of a lever handle described below.

The peripheral wall 315a of the guide holder 315 is also provided with brackets 318 and 318' that are integral with the holder 315. These brackets 318 and 318' extend outwardly from both sides of generally the central portion of the cutout 317. The brackets 318 and 318' are provided with through-holes 319 and 319' that face each other and through which the base of a suitably bent lever handle 320 is rotatably inserted. A spring pin 322 in contact with the outside surface of the bracket 318 is fixed vertically through the lever handle 320 so as to prevent axial movement of the handle 320. The front end of the lever handle 320 is provided with a male threaded portion 320a over which a hexagonal nut 323 is threaded and secured against rotation.

The hexagonal nut 323 may be secured against rotation by the following method. The circumferential surface of the peripheral wall 315a, of the guide holder 315 is nicked to form a flat-faced portion 315b near the base of the bracket 318' and one flat-faced outside portion of the hexagonal nut 323 is butted against the flat-faced portion 315b.

A key 324 is fitted in the key groove 316. this key 324 has a generally semicircular cross section so that it matches the key groove 316. The inside surface of the semicircular key 324 which contacts the circumferential surface of the peripheral wall 302a of the column 302 is in the form of a circular arc 324a that has substantially the same curvature as the circumferential surface of the column 302. From the circular face 324a, one or more anti-slip pins 324b (two such pins are provided in the embodiment shown) project inwardly as integral portions of the circular face 324a and are engaged with an elongated slot 325 that is formed in the peripheral wall 302a of the column 302.

A switch case 700 is to be adjustably attached to the guide arm 100 and has the construction shown in FIGS. 14 to 19. As already mentioned, the guide arm 100 is typically formed of a U-shaped channel member and its cross section generally assumes an inverted U shape. A body 701 of the switch case 700 has a generally rectangular shape as viewed from the front and is elongated horizontally so that it can be fitted into the front end of the guide arm 100. A front wall 703 of the case body 701 has a recess 704 in its front face and switch button mounting holes 705 and 706 are formed side by side in the central portion of the front wall 703. Behind the front wall 703 is provided a switch-receiving recessed portion 707 that is closed at the bottom and which is open at its top 707a. An appropriate open space or vacancy 708 (FIG. 18) is provided between the front wall 703 and the recess 707 which, as seen from the top, has a generally rectangular shape that is defined by a bottom wall 707b, a front defining wall 707c, a rear wall 707d, and side walls 707e and 707f.

In the rear portion of the bottom wall 707b of the recess 707, a rib 710 is erected and a switch 709 is tightly fitted between the front defining wall 707c and the rib 710 so that it will not be displaced in either a horizontal (i.e., longitudinal) or a lateral direction. In the front defining wall 707c of the recess 707, U-shaped grooves 713 and 714 that are concentric with the switch button mounting holes 705 and 706, respectively, are formed side by side in the central portion of the front defining wall 707c. These U-grooves 713 and 714 are so shaped as to be capable of receiving two switch button mounting tubes 711 and 712 that project from the front face of the switch 709. In the central portion of the rear wall 707d, U-grooves 712 and 716 are formed side by side as channels into which power cables 738 and 739 are to be inserted.

A groove 718 into which a lead wire cover 717 is to be fitted is formed in the rear portion of the recess 707 and this groove 718 is generally U-shaped in the upright direction as seen from the front. A planar top switch cover 720 is connected to the rear portion of the recess 707 by two thin-walled flexing hinges 719 that are formed on two sides of the top of the rear wall 707d. The switch cover 720 is formed as an integral part of the case body 701 and has a sufficient length and width to close the open tops 707a and 708a of the recess 707 and the vacancy 708 when it is folded over the case body 701.

In the embodiment shown, the case body 701 has recesses 725 and 726, each with a bottom, that are formed on both sides of the open space 708. The recess 725 or 726 is defined by a back wall 722 that is spaced from the front wall 703 and which is an integral part thereof. The recess 725 or 726 is further defined by the front wall 703, a side wall 723 or 724, and the side wall 707e or 707f of the recess 707. In one of these recesses (recess 725 in the case of the embodiment shown), a switch locking plate 727 is confined in such a manner that it is slidable in the leftward or rightward direction and that it is urged toward the vacancy 708 by means of a compression spring 728 loaded between it and the side wall 723.

The switch 709 has an OFF switch button 729 and an ON switch button 730 which are slidably fitted into the mounting holes 705 and 706, respectively. As shown in FIG. 18, the switch locking plate 727 is confined in the recess 725 associated with the ON switch button 730. A thin-walled locking tab 727a that extends from the front end of the locking plate 727 is inserted into a groove 770 that establishes communication between the open space 708 containing the switch 709 and the recess 725 containing the locking plate 727. Because of this arrangement, the switch locking plate 727 is urged into the open space 708 by the force of the compression spring 728 until the tab 727 contacts a switching rod 730a of the ON-switch button 730. In this position, the locking tab 727a is pushed between ON-switch button 730 and the mounting tube 712. As a result, the ON-switch button 730 is locked in a disabled state.

The locking plate 727 has a tapered hole 731 that horizontally extends through the locking plate 727 (see also FIG. 20(a)). Holes 732 and 733 that correspond to this tapered hole 731 are formed in the front wall 703 and back wall 722, respectively, of the case body 701. When an unlocking (lock releasing) pin 734 is pushed into the hole 732 when the ON-switch button is locked as shown in FIG. 18, the front end of the pin 734 contacts the tapered face 731a of the hole 731 and its thrust force causes the locking plate 727 to retract by overcoming the force of the spring 728 until the ON-switch button 730 becomes unlocked.

The case body 701, switch receiving recess 707 and the switch cover 720 are made of an insulating material such as plastics or rigid rubber to form an integral assembly.

The lead wire cover 717 is typically formed of a U-shaped channel member and has a generally U-shaped cross section. The front end of the cover 717 is fitted in the groove 718 at the back of the recess 707, as shown in FIGS. 18 and 19 and its rear end is fitted in a groove (not shown), which is typically formed in the guide holder 315 of the adjuster 300 (see FIG. 1), such that the open top of the cover 717 is closed with the top wall 101a of the guide arm 100. Because of this arrangement, an elongated cable tray 737 is formed between the bottom of the lead wire cover 717 and the top wall 101a of the guide arm 100 and two power cables 738 and 739 are accommodated in this cable tray 737, with one end of each cable being connected to the switch 709.

The case body 701 fitted into the front end of the guide arm 100 is secured by fastening screws 740 (FIGS. 1 and 18).

The power cables 738 and 739 each of which is connected at one end to the switch 709 are laid through the cable tray 737 and, as shown in FIG. 1, the saw cable 739 is withdrawn from the guide arm 100 at an appropriate point and connected to the motor 515 for driving the saw member 500. On the other hand, the other cable 738 is led from the adjuster 300 to be connected to a plug (not shown).

The switch 709 is confined in the recess 707 in such a manner that the front defining wall 707c and rib 710 prevent both longitudinal and lateral movement of the switch. Switching rods 711 and 712 which are parallel to each other extend from the front face of the switch 709, and the OFF and ON push buttons 729 and 730 are mounted on these switching rods in such a manner that they can be pushed into or retracted from the case body 701 through the respective holes 705 and 706 that are made through the front wall 703.

As already mentioned, the cables 739 and 739 are connected to the switch 709 and the saw cable is connected to the motor 515 for driving the saw member 500 while the power supply cable 738 is connected to a power supply (not shown).

The switch 709 is so constructed that when one of the switch buttons 729 and 730 is pushed, the other button will pop up. When the ON-switch button 730 is pushed, the motor 515 turns on and starts to rotate. When the OFF-switch button 729 is pushed, the motor 515 turns off and stops rotating.

In the back of the front wall 703 of the switch case body 701, the three recesses 725, 708 and 726 are formed between the front wall 703 and the switch receiving recess 707. These recessed portions are separated by side defining walls 750 and 760. The central recess 708 is connected with the right-hand recess 725 by way of the U-shaped groove 770. In the recess 725, the switch locking plate 727 is confined in a direction perpendicular to the ON-switch button 730, or in such a manner that it is slidable in the vertical direction illustrated in FIG. 18, actually the horizontal direction in use. The compression spring 728 is disposed between the rear end of the locking plate 727 and the side wall 723 of the case body 701 and urges the locking plate 727 toward the ON-switch button 730.

The front end of the switch locking plate 727 has the locking tab 727a which, as shown in FIGS. 20(a) to (c), is an integral part of the locking plate 727 and extends from one side thereof. This locking tab 727a projects into the recess 708 through the groove 770 to engage with the back side of the ON-switch button 730. The central portion of the front face of the tab 727a is provided with a recess 727b which is used to engage the switching rod 730a of the ON-switch 730. The locking plate 727 has the unlocking hole 731 which is made through its generally central portion to extend horizontally in FIG. 18. This unlocking through-hole 731 is in alignment with the pin insertion holes 732 and 733 that are concentric with each other and which extend horizontally through the front wall 708 and the front defining wall 722 of the case body 701.

An opening 731b of the unlocking hole 731 has on one side thereof a contact face 731a which is used to contact the front end of the unlocking pin 734 when it is pushed into the hole 732 when the switch 709 is OFF with the ON-switch button 730 popped up as shown in FIG. 18. The contact face 731a is inclined or tapered from the front side of the locking plate 727 toward its rear side. The inclined surface faces the ON-switch button 730. When the unlocking pin 734 is pushed into the hole 732, its front end slides along the contact face 731a and causes the locking plate 727 to slide back by counteracting the force of the spring 728 until the ON-switch button 730 is unlocked, i.e., brought out of engagement with the locking tab 727a.

One end of the spring 728 maybe fitted into a recess 727c formed in the rear portion of the switch locking plate 727 and this is effective for the purpose of preventing the spring 728 from tilting or disengaging from the plate 727.

The front face of the wall 703 of the case body 701 is recessed (recess 704 of FIGS. 18 and 19) so that neither of the ON and OFF switch buttons 730 and 729, when they pop up in their inactive state, will protrude outwardly from a front end face 701a of the case body 701.

In the embodiment shown, the switch cover 720 which is an integral part of the case body 701 extends from the rear portion of the switch receiving recess 707, with the two members being connected by thin-walled hinges 719. The case body 701 is fitted in the guide arm 100 and secured thereto with screws 740. In this secured condition, the switch cover 720 is bent back at the hinges 719 to cover the central recesses 707 and 708 and part of the side recesses 725 and 726. As a result, the switch 709 and the power cables 738 and 739 in the case body 700 are retained by the switch cover 720.

As shown in FIGS. 4, 5, 21 and 22, a recess 103b is formed in the top central portion of the bearing holder 103 so that the lead wire cover 717 of the cable tray 737 can be conducted along the inner surface of the top wall 101a of the guide arm 100. In the lower part of the bearing holder 103, the lower frame 215 is provided in such a manner so that it is rotatable about the shaft of the vertical bolt 113 and so that it can be secured by clamping with the lever 224.

To the front end of the guide arm 100, the case body 701 is fitted and secured by fastening with the screws 740. The switch 709 accommodated in the case body 701 has the ON switch button 730 and the OFF switch button 729.

The lead wire cover 717 for retaining the power cables 738 and 739 in position is elongated and typically formed of a U-shaped channel member to provide a generally U-shaped cross section.

The corresponding areas of the back of the case body 701 and the guide holder 315 in the adjuster 300 are provided with respective grooves 774 and 375 that are generally U-shaped as seen from the front so that they match the respective ends of the lead wire cover 717. By fitting the ends of the lead wire cover 717 in the grooves 774 and 375, the cover 717 can be confined in the interior of the guide arm 100 in such a manner that the open top of the cover 717 is closed by the top wall 101a of the guide arm 100 while the cable tray 737 having a rectangular cross section is formed between the case body 701 and the adjuster 300.

The guide arm 100 is mounted on the guide holder 315 by placing one end of the guide arm 100 on the top end surface of the guide holder 315 and securing them together with a suitable device such as a bolt (FIG. 1). The switch case body 701 is installed by first fitting it into the guide arm 100 and by then securing them together with screws 740. Therefore, the lead wire cover 717 can be assembled simultaneously with other components by typically employing the following procedures. When the guide arm 100 is fixed to the guide holder 315, one end of the cover 717 is fitted at its rear into the groove 375 in the guide holder 315, when the case body 701 is fitted in the guide arm 100, the front end of the cover 717 is fitted into the groove 774 in the case body 701. Then finally, the case body 701 is secured to the guide arm 100 with screws 740.

When the lead wire cover 717 is installed in the manner described above, the power cables 738 and 739 are accommodated in the cable tray 737 between the cover 717 and the upper wall 101a of the guide arm 100. The cable 739 is led through an opening 101f made in an appropriate area of the top wall 101a of the guide plate 100 and is connected to the motor 515 for driving the saw member 500. The other cable 738 is also led to the outside by way of a notch 777 that is made either in the cover 717 in an area close to the guide holder 315 or in an appropriate area of the guide holder 315 itself.

The device for mounting the base 400 and tables of the radial arm saw of the present invention is hereunder described. As shown in FIG. 1, 23 and 24 (FIG. 24 being a cross section viewed along the longitudinal axis), the base 400 is composed of an integral combination of a base body 401 and the base holder 402 which are made as separate entities. The base body 401 is formed of a steel channel section or some other adequately rigid member that has a generally U-shaped cross section, which are bent at right angles at appropriately selected two points so that the channeled portion will face inward. The resulting base body 401 is generally U-shaped as seen from above and has an open side 401a facing inward.

The base holder 402 is a unitary member formed of a strong material such as steel. It consists of a top plate 402a, a vertical tubular member 402b having a column mounting hole 402c, and a skirt 402d below the top plate 402a. The top plate 402a is formed in an elongated shape that is as wide as the open side 401a of the base body 401. The tubular member 402b is disposed perpendicularly to the center of the top plate 402a as an integral part of it. The skirt 402d is an extension of the top plate 402a which is bent downwardly by an appropriate width. The components of the base holder 402 are combined together to provide a shape that has adequate toughness.

The base body 401 is firmly secured to the base holder 402 by means of sidewardly extending bolts 404 and spring washers 403, with the ends of the base holder 402 being superposed on the inside edges of the open side 401a of the base body 401. the combinatin of the base body 401 and the base holder 402 assumes a rectangular shape as seen from the top.

The column 302 is erected to stand within the vertical tubular member 402b with its lower end being fitted in the column mounting hole 402c. Therefore, in order for the base holder 402 to have sufficient mechanical strength to support not only the column 302 but also the adjuster 300, the guide arm 100 and the saw member 500 whose weights are transmitted through the column 302, the top plate 402a has such a shape that it slopes downwardly from the vertical tabular member 402b to each lateral side.

The vertical tubular member 402b is formed with a slot 402e that extends axially on one side of this member. A lever clamping handle 409 is inserted through two parallel brackets 402f that project from the side of the vertical tubular member 402b where the slot 402 is formed and which are positioned on opposite sides of the slot. A nut 410 is threaded onto the front end of the handle 409 and is secured against rotation by being brought into contact with a part of the vertical tubular member 402b. A spring pin 412 is provided perpendicularly to a plain washer 411 placed in contact with the right-hand bracket 402f (see FIG. 23). Because of this arrangement, when the handle 409 is moved in the clamping direction, the vertical tubular member 402b is reduced in diameter and the column 302 is securely fastened to the base holder 402.

A stopper pin 413 is slidably inserted through a transverse hole 402g that is made through one side of the vertical tubular member 402b. The stopper pin 413 is also inserted through a bracket 402h erected on the top plate 402a. The stopper pin 413 is urged toward the inside of the vertical tubular member 402b by means of a compression spring 415 which is supported at one end with a stop ring 414 on the pin 413 and at the other end with the bracket 402h. In this way, the stopper holes 416 that are formed in the circumferential surface of the column 302 at given intervals, so that the column 302 may, by operation of the stopper pin 413, be permitted to rotate only at predetermined angles in the circumferential direction. That is, the stopper pin 413 acts as a selectively operable detent.

Table angle irons 417, which are typically made of an L-shaped steel section, extend longitudinally under the base body 401 on both its sides and are fixed to the latter with a plurality of bolts 404. Two tables 419 and 420 and a table fence 421 are mounted on the two table angle irons 417. In FIGS. 1 and 23, are shown two table clamping screws 422 threaded into the base holder 402 and clamping the table 420.

As shown in FIGS. 25, 26(a) and 26(b), each of the table angle irons 417 has on its side a slot 417c that permits its positional adjustment in the vertical direction and through which a bolt 404 is inserted and secured to the base body 401 by means of a nut 405, a plain washer 408 and a spring washer 409.

Each of the table angle irons 417 is secured to the base body 401 in such a manner that a horizontal top wall 417a of each angle iron 417 is elevated above an edge top wall 401a of the base body 401 by an appropriate distance. In the top wall 401a of each table angle iron 417, two table mounting holes 450 are formed that are spaced apart in the longitudinal direction. Each of these mounting holes 450 has a generally keyhole-shaped form as seen from the top and consists of a combination of a large-diameter circular hole portion 450a and an elongated small-width hole portion 450b.

The large-diameter portion 450a of each mounting hole 450 has a sufficient diameter to permit free passage of the head of a wood screw to be described below. The width of the small-width portion 450b is slightly larger than the diameter of the shank of the wood screw and is slightly smaller than the diameter of the head of the wood screw so that the wood screw head can engage the underside of the peripheral edge of the opening of 450b when the threaded portion of the wood screw is above.

The underside of the peripheral edge of the opening 450b, or the surface which is to engage the head of a wood screw, is made to have an inclined surface 450c which, as shown in FIGS. 26(a) and (b), slopes at a small angle from the side of the large-diameter hole 450a to the end of the small-width hole 450b. The maximum height of the inclined surface 450c, or the distance, l, from a top face 417b of the top wall 417a of the table angle 417 to a descending end 450d of the inclined surface 450c, is made, as shown in FIG. 27, equal to or slightly larger than the distance, l', between an underside 419a of the table 419 and a head 460a of a wood screw 460 that has been partly secured to the underside 419a of the table 419. When the wood screw 460 inserted into the large-diameter hole 450a is allowed to slide toward the small-width hole 450b, the head 460a of the screw 460 slides down the inclined surface 450c, thus lowering the table 419, so as to fix the table 419 in close contact with the top face 417b of the table angle iron 417.

Needless to say, the angle of inclination of the surface 450c should be set to such a small value that after the table 419 has been fixed in the manner described above, the wood screw 460 will not be displaced toward the large-diameter hole 450a by any external force such as the vibration that occurs when a workpiece is cut with a circular saw to be described later in this specification.

In order that a plurality of wood screws 460 can be simultaneously inserted into the mounting holes 450 in the two table angles 417, the wood screws 460 are preliminarily threaded into corresponding areas of the underside 419a of the table 419, with the predetermined gap l' being left between the head of each screw 460 and the underside 419a of the table 419.

The lower edge of the opening of the large-diameter hole portion 450a of each mounting hole 450 on the side opposite the small-width hole portion 450b is bent downwardly to form a rib 450e, which will serve to facilitate the insertion of the wood screw 460 into the large-diameter hole 450a by guiding its head 460a.

In the embodiment shown, the table 419 serves as the main table and the table 420 positioned closer to the base holder 401 works as the sub-table. The sub-table 410, since it is separated from the main table 419 by the table fence 421 is clamped toward the main table 419 by tightening the table clamping screw 422 disposed on each lateral side of the base holder 402. A clamping washer 423 is inserted between the clamping screw 422 and the table 420.

The table clamping screw 422 engages with a threaded hole 424 in the base holder 402 in such a manner that it can be advanced into or retracted from the threaded hole 424 which is made through the base holder 402 in the vertical illustrated direction in FIG. 23 although actually being horizontal.

The device for mounting the lower guards on the radial arm saw of the present invention is described hereinafter with reference to FIGS. 1, 8 10, and 28 to 30. As shown, the motor case 515 for the saw member 500 is supported by the support frame 200 in such a manner that it can be rotated about the lateral shaft 281a or fixed in position, as described previously.

As best shown in FIG. 30, a gear case 555 is fixed on the front end of the motor case 515. A motor shaft 557 of a motor 556 and a blade gear shaft 558 are rotatably supported in different casings 515 and 555 by means of bearings 559/560 and 561/562, respectively. A gear 563 connected to the motor shaft 557 meshes with a gear 566 that is secured to the blade gear shaft 558 together with a locking plate 564 by a suitable means such as a key 565. The rotation of the blade gear shaft 558 is driven by the motor 556.

The front bearing 561 for the blade gear shaft 558 is supported in the gear case 555 by means of a thrust plate 567. An appropriate number of holes (not shown) are made in the circumferential surface of a locking plate 564 for receiving pins that may be inserted through holes (not shown) made in the surface of the gear case 555. If pins are inserted into these holes, the rotation of the blade gear shaft 558 is stopped and a circular saw blade 529 can be dismounted or re-mounted on that blade gear shaft 558.

An inner flange 569 and an outer flange 570 are provided at the extending end of the blade gear shaft 558 and the circular saw blade 529 held between these two flanges 569 and 570 is detachably mounted by means of a hexagonal nut 572 with a dished spring 571 being placed between the nut 572 and the outer flange 570.

The other end of the motor shaft 557 is provided with a collet nut 573 and a collet chuck 574 which may be tightened to mount a router bit (not shown) or some other tool that matches the hole in the collet nut 573.

The upper part of a safety guard 575 has a cross section that resembles an inverted U-shaped with front and rear walls 576 and 577. The rear wall 577 near the motor 556 has an inverted U-groove 578 in the central portion of its lower edge. A cylindrical portion 555a of the gear case 555 is fitted into this U-groove 578. A knob bolt 579 (FIG. 10) is threaded into the safety guard 575 in an area that is slightly below the center of the cylindrical portion 555a. By tightening this bolt 579, the safety guard 575 is detachably mounted on the gear case 555 to cover substantially the upper half of the circular saw blade 529.

A kickback device 580 (FIGS. 1, 10 and 28) is inserted through a hole 582 that is made through the front end of the safety guard 575 and this kickback device 580 is detachably fixed by means of a knob bolt 581.

In the lower part of the safety guard 575, an outer lower guard 583 and a separate inner lower guard 584 are positioned so as to cover the front face and rear face, respectively, of the lower half of the circular saw blade 529. As shown in FIG. 29, the safety guard 575 has a boss 585 that projects from the front face of its front end and which is fitted into a hole 583a provided at the front end of the outer lower guard 583. A small screw 587 is threaded into the boss 585 with a plain washer 586 inserted therebetween so that the outer lower guard 583 is mounted to be rotatable about the boss 585 either upwardly or downwardly.

A rib 588 is formed in an appropriate area (generally the middle portion in the embodiment shown) of the outer lower guard 583 and extends in the radial direction, as shown in FIG. 28, as an integral part of this outer lower guard 583. This rib 588 is in a circular arched form and runs along part of the periphery of an imaginary circle having the center at the boss 585. Another rib 589 that corresponds to the first rib 588 is formed on the front wall 576 of the safety guard 575. As will be apparent from FIG. 29, this rib 589 has a generally L-shaped form as seen from the top. The two ribs 588 and 589 engage in such a manner that the rib 588 on the outer lower guard 583 will slide only in the direction in which the outer lower guard 583 will rotate and that it will not be displaced in any other direction such as the one which is transverse or perpendicular to that rotating direction. Because of this arrangement, the outer lower guard 583 will not move in any direction other than that in which it is to rotate.

An outwardly facing linear rib 590 is formed along the upper edge of the outer lower guard 583, and an outwardly facing linear rib 591 is also formed in the front wall 576 of the safety guard 575 in the area that corresponds to the other linear rib 590. When the outer lower guard 583 is moved downward, the two linear ribs 590 and 591 come into engagement with each other and the outer lower guard 583 will not be rotated further downward. In this position, the front face of the circular saw blade 529 is kept covered with that outer lower guard 583.

The safety guard 575 also has a boss 592 that projects from the rear face of its front end and which is generally concentric with the boss 585 on the front face. This boss 592 is fitted into a hole 584a provided at the front end of the inner lower guard 584. A small screw 594 is threaded into the boss 592, with a plain washer 593 being inserted therebetween so that the inner lower guard 584 is mounted to be rotatable about the boss 592 either upwardly or downwardly.

The outer lower guard 583 is in the form of a plate that has a generally semicircular shape as seen from the front. In contrast, the inner lower guard 584 is generally in the form of a partial ring (dotted ring in FIG. 28) as seen from the front so that it can be rotated upwardly without contacting the cylindrical portion 555a of the gear case 555 or any other components.

An inwardly bent tab 595 is formed on the rotating end, or the rear end, of the inner lower guard 584. A corresponding rib 596 that is capable of engaging the tab 595 is formed on the lower edge of the rear wall 577 of the upper part of the safety guard 575. Engagement between the tab 595 and the rib 596 prevents the inner lower guard 584 from rotating further downwardly so that the inside surface of the circular saw blade 529 will be kept covered with the guard 584 as shown in FIG. 28.

The inner lower guard 584 is formed of a resilient material such as a steel plate so that if its rear end is pulled outwardly, it deforms elastically to bring the tab 595 out of engagement with the rib 596. As a result, the range over which the inner lower guard 583 can be rotated is increased and it can be dismounted or remounted in the gear case 555 together with the safety guard 575 and the outer lower guard 583.

The saw member 500 is pushed back and forth along the guide arm 100 with a handle 599 (see FIG. 1) attached to the support frame 200.

As described previously with reference to FIG. 3, the guide arm 100 in the saw member sliding device in the radial arm saw of the present invention has right-angled L-grooves 102 and 102' formed in the inside surface of its side walls 101b and 101c in a symmetrical and downwardly inclined manner. Bearings 104 and 104' that are positioned on opposite sides of the bearing holder 103 in the guide plate 100 are in engagement with these L-shaped grooves 102 and 102', respectively, in such a manner that they can be moved axially by adjustment of the bearing shafts 105 and 105' at angles equal to those at which the L-shaped grooves 102 and 102' are inclined. Because of this arrangement, any rattling that may occur in the guide member between the L-shaped groove 102 (or 102') and the bearing 104 (or 104') can be eliminated readily and accurately by simply displacing the bearing shaft 105 (or 105') in its axial direction. This is also true with the case where it is desired to tilt the bearing holder 103 by a small angle. In addition, the bearing shafts 105 and 105' may be formed of bolts or any other known devices and require only means for allowing these shafts to be moved axially. Therefore, the blade member sliding device in the radial arm saw of the present invention is advantageous over the prior art device not only with respect to use and manufacture but also in regard to costs.

As also previously described with reference to FIGS. 4 or 5, the radial arm saw of the present invention employs a special mechanism for locking the sliding motion of the bearing holder 103 which, together with the blade member 500, is slidably fitted in the guide arm 100. The square locking spring 619 having a generally U-shaped form as seen from the side is secured in the square hole 618 formed in one side wall of the bearing holder 103. The knob 622 is threaded into the hexagonal bolt 620 which is supported on the bearing 103 in such a manner that it is secured against rotation. When the knob 622 is advanced toward the guide arm 100, the locking spring 619 is compressed and the side wall 101b of the guide plate 100 is squeezed in the U-shaped opening 619g of the spring 619 so that the bearing holder 103 is locked with respect to the guide plate 100. Therefore, the sliding motion of the bearing holder 103 can be readily locked or unlocked by simply advancing or retracting the knob 622. The mechanism for achieving this action can be fabricated at low cost since it is composed of a reduced number of components, i.e., the locking spring 619 which is simply formed of a U-shaped metal plate, the hexagonal bolt 620, and the knob 622.

The device for retaining the motor case 515 in the radial arm saw of the present invention is also described in the foregoing pages with reference to FIGS. 8 and 10. A pair of ribs 517 are formed in the cylindrical shaft 516 which projects from the motor case 515 as an integral part thereof. When the knob screw 281 threaded into the motor case shaft 516 is tightened, the leaf spring 519 having a mesa-shaped section as seen from the side is deformed into a flat shape by overcoming its own spring force. As a result, the ribs 517 are compressed to deform radially and outwardly and are pressed against the inside surface of the shaft hole 228 in the frame 200 so that the motor case 515 is retained on the frame 200. Therefore, by simply tightening or loosening the knob screw 281, the motor case can be attached or detached from the frame and blade angle changes can be effected in an easy and reliable manner. The mechanism for attaining these results can be fabricated at low cost since it is composed of a reduced number of components, namely, the ribs 517 on the motor case shaft 516, the leaf spring 519, and the knob screw 281.

As described previously with reference to FIGS. 12 and 13, the adjuster in the radial arm saw of the present invention is secured against rotation by a special mechanism. The guide holder 315 has the key groove 316 with a generally semicircular cross section, as well as the longitudinal cutout 317 that communicates with this key groove 316. When the semicircular key 324 is fitted in the key groove 316 and the guide holder 315 clamped by operation of the lever handle 320, the arched surface 316a of the key groove 316 is brought into intimate contact with the arched outer surface 324a of the key 324, which is also pressed tightly against the circumferential surface of the vertical support column 302. As a result, the guide holder 315 can be securely fixed against the column 302 without causing any rattling. This result can be attained by a simple mechanism without using any key retaining device or retainer screw. In addition, the key groove 316 and the key 324 require comparatively low dimensional accuracy and can be fabricated at low cost.

As described in the foregoing pages with reference to FIG. 18, the switch case in the radial arm saw of the present invention includes the case body 701 and the switch cover 720 which form a unitary assembly. The case body 701 has the recess 707 in which the switch 709 having one end of each the power cables 738 and 739 connected thereto is accommodated. When the case body 701 is fitted in the guide arm 100 with the switch cover 720 being folded back at the hinges 719 to cover the case body 701, the switch cover 720 is held in position by the top wall 101a of the guide arm 100 so that the switch 709 and the power cables 738 and 739 are covered with the switch cover 720. Therefore, the switch case can be readily mounted on the guide arm 100 by simple procedures. The switch case is also simple in construction since it is a unitary assembly of the switch cover 720 and the case body 701 and does not require any extra component such as a cable retainer. In addition, this switch case can be fabricated by an efficient and economical forming method such as die molding.

As described in the foregoing pages also with reference to FIG. 18, the radial arm saw of the present invention employs a special mechanism for locking the switch buttons. The switch locking plate 727 is slidably confined in the interior of the switch case body 701 while it is urged toward the ON-switch button 730 by the spring 728 so as to lock the ON-switch button 730 in an OFF state in which it protrudes outwardly and is not in the position to actuate the ON mode. The locking of the ON-switch button 730 will not be released unless the unlocking pin 734 is inserted to cause the locking plate 727 to slide away from said switch button. Therefore, the ON-switch 730 can be reliably locked in a disableed ON state by the simple mechanism consisting of the locking plate 727 and the spring 728. The reliability of this locking mechanism is further increased by the fact that the locking plate 727 is confined in the interior of the case body 701 and will not be erroneously operated by some accident such as contact with an external object. The locking of the ON switch button 730 can be released by simply inserting the unlocking pin 734 into the hole 731 in the locking plate 727 through the insertion hole 732. If the pin 734 is extracted, the locking plate 727 will slide in the forward direction under the action of the spring force until it re-locks the ON switch button 730 in an OFF state. Therefore, the ON switch button 730 can be easily locked or unlocked by very simple operations.

The device for mounting a lead wire cover in the radial arm saw of the present invention is also described in the foregoing pages with reference to FIG. 21. The guide holder 315 of the adjuster 300 which is fixed at its base end is fitted in the guide arm 100 which supports the saw member 500 in such a manner that it is capable of moving back and forth and is rotatable in two axial directions. The switch case body 701 is attached to the front end of the guide member 100. The lead wire cover 717 can be mounted simultaneously with other components by simply inserting it between the case body 701 and the guide holder 315, with one of its ends being fitted into the groove 774 formed in the case body 701 while the other end is fitted into the groove 375 in the guide holder 315. Structural advantages are also achieved since the lead wire cover 717 has a generally U-shaped cross section and the case body 701 and the guide holder 315 are only required to have the grooves 774 and 375 that match the shapes of the ends of the lead wire cover 717. In addition to this structural simplicity, the lead wire cover 717 can be mounted very easily. Furthermore, the open top of the cover 717 is closed with the top wall 101a of the guide plate 100 so that the cables 738 and 379 can be securely held within their cable tray 737.

As described in the foregoing pages with reference to FIG. 23, the radial arm saw of the present invention is also characterized by the base it employs. It consists of the base body 401 having a U-shaped form as seen from the top which is combined with the base holder 402 by suitable means such as fastening both ends of 402 with bolts so as to make a rugged unitary assembly that is rigid enough to work satisfactorily as the base. In addition to this structural simplicity, the base body 401 and base holder 402 can be separately prepared and then assembled by fastening with bolts 404. This provides greater ease of fabrication than when it is attempted to make a rigid base from a single solid member. In addition, this method renders it possible to provide the necessary rigidity for the base more easily than the prior art techniques.

The table 419 is the radial arm saw of the present invention is mounted in the following procedures. Wood screws 460 are preliminarily threaded into the underside 419a of the table 419 in such a manner that the head of each screw 460 protrudes from the underside 419a of the table 419 by an appropriate distance l'. Each of the two table angle irons 417 has the mounting holes 450 in its top wall 417a in the areas corresponding to those where the wood screws 460 are fixed in the table. Each of the mounting holes 450 has a shape that resembles a keyhole as seen form the top and consist of a large-diameter hole portion 450a and a small-width hole portion 450b. After each table angle iron is attached to the table 419 in such a manner that the wood screws 460 are fitted in the corresponding mounting holes 450 in their large-diameter hole portion 450a. Thereafter, the wood screws are allowed to slide toward the small-width hole portion 450b of the mounting holes, whereupon the head 460a of each screw is guided to the descending end of the inclined surface 450c formed on the underside of the peripheral edge of the small-width hole portion 450b. As a result, the wood screws 460 are permitted to slide downwardly until the table 419 is tightly fixed to the top surface 417b of each table angle iron 417. Therefore, the table 419 can be readily mounted by simply inserting the wood screws 460 into the corresponding mounting holes 450 and sliding them in a predetermined direction. Dismounting of the table can be easily effected by reversing this order. As a result, the radial arm saw of the present invention can be readily constructed or disassembled as required. In addition, the mounting holes 450 can be readily formed in the table angles with a conventional machine tool such as a press. Because of this simplicity in its structure, the table mounting mechanism used in the radial arm saw of the present invention can be fabricated at low cost.

As previously described with reference to FIG. 30, the radial arm saw of the present invention employs a special mechanism for mounting lower guards for a circular saw. The outer lower guard 583 has the rib 588 in a circular arched form which engages the rib 589 on the safety guard 575 in such a manner that the rib 588 on the outer lower guard 583 will slide only in the direction in which the outer lower guard 583 is to rotate and that it will not be displaced in any other direction such as the one which is transverse or perpendicular to that rotating direction. Because of this absence of rattling, a cutting operation with the circular saw can be accomplished with the outer lower guard 583 rotating in a reliable and steady manner. In addition, the lower guard mounting device in which the outer lower guard 583 is rotatably supported on the safety guard 575 at a single point is simple in construction and can be fabricated at low cost.

What is claimed is:

1. A radial arm saw, comprising:
   a base;
   a column extending vertically from said base;
   a vertical position adjuster vertically adjustable on said column;
   a guide arm extending horizontally from and supported by said vertical position adjuster, said guide arm having a generally inverted U-shape with a top wall and two side walls, each of said side walls having matching L-shaped grooves running longitudinally along inner sides of said two side walls of said guide arm, extensions of lower surfaces of said grooves intersecting substantially vertically below a centerline of said guide arm;
   a saw member including a motor to which a saw blade is connectable;
   holding means for holding said saw member to said guide arm, said holding means being slidable on said guide arm at a portion away from said vertical position adjuster, said holding means including a bearing holder and bearings symmetrically mounted on lateral sides of said bearing holder, engaging said grooves and rotatably mounted on axles aligned with said lower surfaces of said grooves, wherein said holding means further includes means for adjustably moving said bearings along directions of their respective axles, so that when said bearings are moved toward said holding means, a distance between said bearings and said grooves increases.

2. A radial arm saw as recited in claim 1, wherein said vertical position adjuster comprises:
   a guide holder, fittable over said column and supporting said guide arm, having a longitudinal key groove of generally semicircular cross section longitudinally formed in an inner surface along said vertical column, and having a radial and longitudinal cutout in a peripheral wall connected with said key groove and two brackets facing said cutout;
   a semicircular key having a shape matching said key groove and having one or more inwardly radially extending pins in engagement with said column; and
   tightening means for selectively tightening said two brackets together.

3. A radial arm saw as recited in claim 1, wherein said saw member includes a casing containing a motor shaft to which a circular saw blade is mountable and a guard for protecting against said saw blade, said guard comprising:
   an upper guard generally covering an upper half of said mounted saw blade and fixed to said casing and including a circular rib; and
   an outer lower guard disposed on a side of said saw blade opposite said casing and rotatably mounted on said upper guard and including a circular arched rib concentric with a rotation of said outer lower guard and closely engaging said rib ofd said upper guard, whereby said outer lower guard is displacable substantially only with said rotation of said outer lower guard.

4. A radial arm saw, comprising:
   a base;
   a column extending vertically from said base;
   a vertical position adjuster vertically adjustable on said column;
   a guide arm extending horizontally from and supported by said vertical position adjuster, said guide arm having a generally inverted U-shape with a top wall and two side walls, each of said side walls having matching L-shaped grooves running longitudinally along inner sides of said two side walls of said guide arm, extensions of lower surfaces of said grooves intersecting substantially vertically below a centerline of said guide arm;
   a saw member including a motor to which a saw blade is connectable;
   holding means for holding said saw member to said guide arm, said holding means being slidable on said guide arm at a portion away from said vertical position adjuster, said holding means including a bearing holder and bearings symmetrically mounted on lateral sides of said bearing holder, engaging said grooves and rotatably mounted on axles aligned with said lower surfaces of said grooves,
   wherein said holding means is rotatable about a vertical axis and includes a shaft hole perpendicular to said vertical axis;
   wherein said saw member includes a casing enclosing motive means including said motor and having a horizontal cylindrical shaft as an integral part of at least part of said casing, said horizontal shaft being fittable into said shaft hole, projecting from a main part of said casing and having ribs longitiudinal with said horizontal shaft and longitudinal gaps between said ribs, whereby said ribs are deformable in a radial direction of said horizontal shaft; and wherein said holding means further includes a leaf spring fittable within said horizontal shaft and having a plurality of arms inclined from a planar center thereof engaging respective ones of said ribs and a knob screw engaging said planar center of said leaf spring, wherein a displacement of said knob screw against said planar center deforms said ribs of said motor casing to engage said shaft hole of said holding means.

5. A radial arm saw as recited in claim 4, wherein said knob screw is threaded into said casing.

6. A radial arm saw, comprising:

a base;

a column extending vertically from said base;

a vertical position adjuster vertically adjustable on said column;

a guide arm extending horizontally from and supported by said vertical position adjuster, said guide arm having a generally inverted U-shape with a top wall and two side walls, each of said side walls having matching L-shaped grooves running longitudinally along inner sides of said two side walls of said guide arm, extensions of lower surfaces of said grooves intersecting substantially vertically below a centerline of said guide arm;

a saw member including a motor to which a saw blade is connectable;

holding means for holding said saw member to said guide arm, said holding means being slidable on said guide arm at a portion away from said vertical position adjuster, said holding means including a bearing holder and bearings symmetrically mounted on lateral sides of said bearing holder, engaging said grooves and rotatably mounted on axles aligned with said lower surfaces of said grooves; and wherein said bearing holder further comprises:

a rectangular aperture in a side of said bearing holder partially facing one of said side walls of said guide arm;

a locking spring of at least partially rectangular shape as viewed along a springing direction of said locking spring, having a general U-shape as viewed transversely to said springing direction, fittable partially into said rectangular aperture, and accommodating said one side wall of said guide arm between legs of said U-shape of said locking spring;

a threaded bolt secured against rotation in said side of said bearing holder and inserted through said locking spring in said springing direction; and tightening means threaded onto an end of said threaded bolt opposite said bearing holder and selectively compressibly engaging said locking spring against said one side wall of said guide arm.

7. A radial arm saw, comprising:

a base;

a column extending vertically from said base;

a vertical position adjuster vertically adjustable on said column;

a guide arm extending horizontally from and supported by said vertical position adjuster, said guide arm having a generally inverted U-shape with a top wall and two side walls, each of said side walls having matching L-shaped grooves running longitudinally along inner sides of said two side walls of said guide arm, extensions of lower surfaces of said grooves intersecting substantially vertically below a centerline of said guide arm;

a saw member including a motor to which a saw blade is connectable;

holding means for holding said saw member to said guide arm, said holding means being slidable on said guide arm at a portion away from said vertical position adjuster, said holding means including a bearing holder and bearings symmetrically mounted on lateral sides of said bearing holder, engaging said grooves and rotatably mounted on axles aligned with said lower surfaces of said grooves;

a switch case including an integral case body closely fittable between said side walls and said top wall of said guide arm at a front free end thereof, said case body comprising:

a front wall having two openings for switch buttons;

a rear wall having two openings for power cables;

a recess formed between said front and rear walls; and a switch cover joined to said switch case by thin-hinge portions such that said switch cover is folded back over said recess from a side near said rear wall;

wherein said switch case further comprises a switch having said buttons and connected to said power cable and fit into said recess.

8. A radial arm saw, comprising:

a base;

a column extending vertically from said base;

a vertical position adjuster vertically adjustable on said column;

a guide arm extending horizontally from and supported by said vertical position adjuster, said guide arm having a generally inverted U-shape with a top wall and two side walls, each of said side walls having matching L-shaped grooves running longitudinally along inner sides of said two side walls of said guide arm, extensions of lower surfaces of said grooves intersecting substantially vertically below a centerline of said guide arm;

a saw member including a motor to which a saw blade is connectable;

holding means for holding said saw member to said guide arm, said holding means being slidable on said guide arm at a portion away from said vertical position adjuster, said holding means including a bearing holder and bearings symmetrically mounted on lateral sides of said bearing holder, engaging said grooves and rotatably mounted on axles aligned with said lower surfaces of said grooves, further comprising:

a switch case body accommodated in a free end of said guide arm;

a switch accommodated in said switch case body and having an on pushbutton and an off pushbutton;

a locking plate slidable in said switch case body perpendicularly to a shaft of said on pushbutton and having a surface inclined to a direction of said shaft of said on pushbutton;

a spring urging said locking plate toward said shaft of said on pushbutton to mechanically disable activation of said on pushbutton; and a pin movable along said direction of said shaft of said on pushbutton and contactable with said inclined surface of said locking plate, whereby said urged locking plate is retreatable from said shaft of said on pushbutton.

9. A radial arm saw as recited in claim 8, wherein said switch case body has two pin insertion holes on either side of said locking plate and said pin is insertable into said pin insertion holes for contacting said inclined surface and said inclined surface is part of a hole penetrating said locking plate.

10. A radial arm saw, comprising:
a base;
a column erected on a base;
an arm supported by said column and having a U-shape with a top wall and two side walls;
a mounting frame hanging from a bottom of said arm and movable in a longitudinal direction of said arm; and
a saw member supported by said mounting frame;
said mounting frame comprising;
a rectangular aperture in a side of said mounting frame partially facing one of said side walls of said arm,
a locking spring of at least partially rectangular shape as viewed along a springing direction of said spring, being generally U-shaped as viewed transversely to said springing direction, fittable partially into said rectangular aperture, and accommodating said one side wall of aid arm between legs of said U-shape of said locking spring;
threaded means secured against rotation in said side of said platform; and
tightening means threaded into said threaded means opposite said platform and selectively compressively engaging said locking spring against said one side wall of said guide arm, one of said threaded means and said tightening means inserted through said locking spring in said springing direction.

11. A radial arm saw, comprising:
a base;
a column erected on said base;
an arm supported on said column; p1 a saw member supported on said arm to be movable in a longitudinal direction of said arm;
a switch case body accommodated in a free end of said arm;
a switch accommodated in said switch case body and having an on pushbutton and an off pushbutton;
a locking plate slidable in said switch case body perpendicularly to a shaft of said on pushbutton and having a surface inclined to a direction of said shaft of said on pushbutton; and
a pin movable along said direction of said shaft of said on pushbutton and contractable with said inclined surface of said locking plate, whereby said urged locking plate is retreatable from said shaft of said on pushbutton.

12. A radial arm saw as recited in claim 11, wherein said switch case body has two pin insertion holes on either side of said locking plate and said pin is insertable into said pin insertion holes for contacting said inclined surface and said inclined surface is part of a hole penetrating said locking plate.

* * * * *